United States Patent
Kitahata et al.

(10) Patent No.: US 11,433,912 B2
(45) Date of Patent: Sep. 6, 2022

(54) VEHICLE FAILURE-FACTOR SPECIFYING APPARATUS

(71) Applicant: TOYOTA JIDOSHA KABUSHIKI KAISHA, Toyota (JP)

(72) Inventors: Takeshi Kitahata, Toyota (JP); Atsushi Tabata, Okazaki (JP); Kenji Miyasaka, Toyota (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/023,549

(22) Filed: Sep. 17, 2020

(65) Prior Publication Data

US 2021/0107497 A1  Apr. 15, 2021

(30) Foreign Application Priority Data

Oct. 11, 2019  (JP) .............................. JP2019-188226

(51) Int. Cl.
*F16H 61/12* (2010.01)
*B60W 50/02* (2012.01)
(Continued)

(52) U.S. Cl.
CPC ......... *B60W 50/0205* (2013.01); *F16H 59/18* (2013.01); *F16H 59/44* (2013.01);
(Continued)

(58) Field of Classification Search
CPC ..... F16H 2061/0075; F16H 2061/0087; F16H 2061/1208; F16H 59/44; F16H 59/72;
(Continued)

(56) References Cited

U.S. PATENT DOCUMENTS

| | | | |
|---|---|---|---|
| 2017/0039785 A1* | 2/2017 | Richter | G07C 5/008 |
| 2019/0234336 A1* | 8/2019 | Kim | G07C 5/0808 |
| 2021/0350636 A1* | 11/2021 | Tang | G06N 3/0454 |

FOREIGN PATENT DOCUMENTS

| | | | |
|---|---|---|---|
| DE | 102019211891 A1 * | 10/2020 | B60W 30/165 |
| JP | 2004-272375 A | 9/2004 | |
| JP | 2006349428 A * | 12/2006 | |

OTHER PUBLICATIONS

English translation of JP2006349428A; https://translationportal.epo.org; May 10, 2022 (Year: 2022).*

* cited by examiner

*Primary Examiner* — Roger L Pang
(74) *Attorney, Agent, or Firm* — Oliff PLC

(57) ABSTRACT

A vehicle failure-factor specifying apparatus includes (a) a peculiarity-presence determining portion configured to determine, based on a pre-failure driving state in a stage prior to occurrence of a certain failure in a vehicle, whether a peculiarity was present or absent in the pre-failure driving state, and (b) a failure-causing-driving state specifying portion configured, when the peculiarity was present in the pre-failure driving state, to determine whether the peculiarity present in the pre-failure driving state of the vehicle is substantially identical with a peculiarity in the pre-failure driving state of other vehicles. The peculiarity-presence determining portion determines whether the peculiarity was present or absent in the pre-failure driving state of the vehicle, depending on whether a frequency distribution of the pre-failure driving state of the vehicle is deviated from a frequency distribution of a non-failure driving state of a plurality of vehicles including the other vehicles in a non-failure case.

9 Claims, 12 Drawing Sheets

(51) Int. Cl.
*F16H 59/18* (2006.01)
*F16H 59/44* (2006.01)
*F16H 59/72* (2006.01)
*G07C 5/08* (2006.01)

(52) U.S. Cl.
CPC ............ *F16H 59/72* (2013.01); *F16H 61/12* (2013.01); *F16H 2061/1212* (2013.01); *G07C 5/0816* (2013.01)

(58) Field of Classification Search
CPC .. F16H 59/18; F16H 2061/1212; F16H 61/12; B60W 50/0205; B60W 2510/104; B60W 2510/107; B60W 2540/10; B60W 2556/10; G07C 5/0816
USPC ........................................................ 701/29.3
See application file for complete search history.

FIG.2

| AT GEAR POSITION | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |
| Rev | ○ |  |  | ○ |  |

VEHICLE FAILURE-FACTOR SPECIFYING APPARATUS

This application claims priority from Japanese Patent Application No. 2019-188226 filed on Oct. 11, 2019, the disclosure of which is herein incorporated by reference in its entirety.

FIELD OF THE INVENTION

The present invention relates to a vehicle failure-factor specifying apparatus for specifying a driving state which causes a failure.

BACKGROUND OF THE INVENTION

There is well-known a vehicle failure-factor specifying apparatus configured, in event of a failure in a vehicle, to specify a failure-causing driving state that is a driving state of the vehicle which caused the failure. A remote failure prediction system disclosed in JP2004-272375A is an example of such an apparatus. This Japanese Patent Application Publication discloses that a failure model is prepared based on vehicle data relating to a plurality of disabled vehicles in accordance with a data mining method. Specifically, in the technique disclosed in the Japanese Patent Application Publication, the vehicle data of the disabled vehicles prior to the failures and failure data relating to the failures that occurred in the disabled vehicles are stored as the failure model are stored in a data base. Further, in the data mining method, the failure model is changed by data addition, and is determined in a stage of comparison with other data.

SUMMARY OF THE INVENTION

By the way, in the above-identified Japanese Patent Application Publication, there is not a specific description about a method of constructing the failure model, i.e., a method of specifying the failure-causing driving state. Therefore, there is a room for improvement in efficiently specifying the failure-causing driving state.

The present invention was made in view of the background art described above. It is therefore an object of the present invention to provide a vehicle failure-factor specifying apparatus capable of efficiently specifying a failure-causing driving state in event of a failure in a vehicle.

The object indicated above is achieved according to the following aspects of the present invention.

According to a first aspect of the invention, there is provided a vehicle failure-factor specifying apparatus configured, in event of a certain failure in a vehicle in execution of a certain control operation, to specify a failure-causing driving state that caused the certain failure. The vehicle failure-factor specifying apparatus comprises: (a) a peculiarity-presence determining portion configured, in the event of the certain failure in the vehicle, to determine, based on pre-failure data representing a pre-failure driving state that is a certain driving state in a stage prior to occurrence of the certain failure, whether a peculiarity (i.e., peculiar tendency) has been present or absent in the pre-failure driving state of the vehicle; and (b) a failure-causing-driving-state specifying portion configured, when the peculiarity-presence determining portion determines that the peculiarity has been present in the pre-failure driving state of the vehicle in the event of the certain failure in the vehicle, to determine whether the peculiarity present in the pre-failure driving state of the vehicle is substantially identical with a peculiarity that has been determined present in the pre-failure driving state of at least one other vehicle other than the vehicle in the event of the certain failure in the at least one other vehicle. The failure-causing-driving-state specifying portion specifies the pre-failure driving state as the failure-causing driving state, namely, determines that the pre-failure driving state of the vehicle is the failure-causing driving state, when determining that the peculiarity present in the pre-failure driving state of the vehicle is substantially identical with the peculiarity present in the pre-failure driving state of each of the at least one other vehicle. The peculiarity-presence determining portion determines whether the peculiarity has been present or absent in the pre-failure driving state of the vehicle, depending on whether a frequency distribution of the pre-failure driving state of the vehicle is deviated from a frequency distribution of a non-failure driving state that is the certain driving state of each of a plurality of vehicles including the at least one other vehicle in a non-failure case in which the certain control operation is executed satisfactorily in the each of the plurality of vehicles. For example, the certain driving state is represented by a driving-state-related value, and each of the frequency distribution of the pre-failure driving state and the frequency distribution of the non-failure driving state represents a number of instances in which the driving-state-related value as a variable appeared in each of various levels in the execution of the certain control operation. Further, for example, the peculiarity-presence determining portion determines that the frequency distribution of the pre-failure driving state of the vehicle is deviated from the frequency distribution of the non-failure driving state of each of the plurality of vehicles, when at least one condition is satisfied, wherein the at least one condition includes a condition that (i) an average of the driving-state-related value of the certain driving state in the frequency distribution of the pre-failure driving state, is different from (ii) an average of the driving-state-related value of the certain driving state in the frequency distribution of the non-failure driving state, by at least a threshold value.

According to a second aspect of the invention, in the vehicle failure-factor specifying apparatus according to the first aspect of the invention, the peculiarity-presence determining portion obtains the pre-failure data representing the pre-failure driving state in a certain period until a failure-occurring time point at which the certain failure has occurred, from a predetermined time point prior to the failure-occurring time point, such that the certain period is a length of time that is long enough to define the frequency distribution of the pre-failure driving state.

According to a third aspect of the invention, in the vehicle failure-factor specifying apparatus according to the first or second aspect of the invention, the certain failure is a shift failure in a vehicle transmission.

According to a fourth aspect of the invention, in the vehicle failure-factor specifying apparatus according to the third aspect of the invention, the certain driving state is represented by a driving-state-related value, wherein the driving-state-related value is categorized into a plurality of groups corresponding to respective different kinds of a shift control operation of the vehicle transmission.

According to a fifth aspect of the invention, in the vehicle failure-factor specifying apparatus according to the third or fourth aspect of the invention, the certain driving state is represented by a temperature of a working fluid in the vehicle transmission.

According to a sixth aspect of the invention, in the vehicle failure-factor specifying apparatus according to any one of the first through fifth aspects of the invention, the certain driving state is represented by an amount of accelerating operation made by a vehicle driver.

According to a seventh aspect of the invention, in the vehicle failure-factor specifying apparatus according to any one of the first through sixth aspects of the invention, the certain driving state is represented by a vehicle running speed.

In the vehicle failure-factor specifying apparatus according to the first aspect of the invention, the presence or absence of the peculiarity in the pre-failure driving state is determined depending on whether the frequency distribution of the pre-failure driving state of the vehicle is deviated from the frequency distribution of the non-failure driving state that is the certain driving state of each of the plurality of vehicles including the at least one other vehicle in the non-failure case in which the certain control operation is executed satisfactorily in the each of the plurality of vehicles. That is, the pre-failure driving state of the vehicle could be appropriately determined as the failure-causing driving state, based on comparison of the peculiarity present in the pre-failure driving state of the vehicle with the peculiarity present in the pre-failure driving state of the at least one other vehicle. Therefore, in event of the certain failure in the vehicle, it is possible to efficiently specify the failure-causing driving state.

In the vehicle failure-factor specifying apparatus according to the second aspect of the invention, the pre-failure data in the certain period from the predetermined time point (prior to the failure-occurring time point) until the failure-occurring time point is obtained, wherein the certain period is the length of time that is long enough to define the frequency distribution of the pre-failure driving state. Therefore, the frequency distribution of the pre-failure driving state can be appropriately defined.

In the vehicle failure-factor specifying apparatus according to the third aspect of the invention, the certain failure is the shift failure in the vehicle transmission, i.e., a performance reduction in a shift control operation executed in the vehicle transmission, so that the failure-causing driving state can be efficiently specified in event of the shift failure in the vehicle transmission, i.e., the performance reduction in the shift control operation.

In the vehicle failure-factor specifying apparatus according to the fourth aspect of the invention, the driving-state-related value representing the certain driving state is categorized into the plurality of groups corresponding to respective different kinds of the shift control operation that is to be executed in the vehicle transmission. Thus, the failure-causing driving state can be efficiently specified in each of the different kinds of the shift control operation whose characteristics vary depending on, for example, whether the shift control operation is a shift-up operation or a shift-down operation, an automatic shift operation or a manual shift operation, and a power-on shift operation or a power-off shift operation, and between which gear positions the shift control operation is executed.

In the vehicle failure-factor specifying apparatus according to the fifth aspect of the invention, the certain driving state is represented by the temperature of the working fluid in the vehicle transmission, so that it is possible to efficiently specify a peculiar driving environment which is caused by operation of the vehicle driver and which causes the failure in the vehicle.

In the vehicle failure-factor specifying apparatus according to the sixth aspect of the invention, the certain driving state is represented by the amount of accelerating operation made by the vehicle driver, so that it is possible to efficiently specify a peculiar operation which is made by the vehicle driver and which causes the failure in the vehicle.

In the vehicle failure-factor specifying apparatus according to the seventh aspect of the invention, the certain driving state is represented by the vehicle running speed, so that it is possible to efficiently specify a peculiar driving environment which is caused by operation of the vehicle driver and which causes the failure in the vehicle.

BRIEF DESCRIPTION OF THE DRAWINGS

FIG. 2 is a table indicating a relationship between each gear position of a mechanically-operated step-variable transmission portion and a combination of engagement devices of the step-variable transmission portion, which are placed in engaged states to establish the gear position in the vehicle of FIG. 1;

DETAILED DESCRIPTION OF PREFERRED EMBODIMENT

In the embodiment of the present invention, the vehicle includes a drive force source and a drive-force transmitting device. The drive-force transmitting device includes the vehicle transmission. A gear ratio in the vehicle transmission is defined as "rotational speed of input-side rotary member/rotational speed of output-side rotary member". A running speed of the vehicle could be lower as the gear ratio is higher, and could be higher as the gear ratio is lower. The highest gear ratio can be expressed also as a lowest-speed gear ratio.

The drive force source is an internal combustion engine such as gasoline engine and diesel engine, which is configured to generate a drive force by combustion of a fuel. Further, the vehicle may include, for example, an electric motor as another drive force source in addition to or in place of the internal combustion engine. The electric motor is broadly interpreted as a kind of an engine.

Hereinafter, preferred embodiment of the invention will be described in detail with reference to the accompanying drawings.

Embodiment

Figure 1:
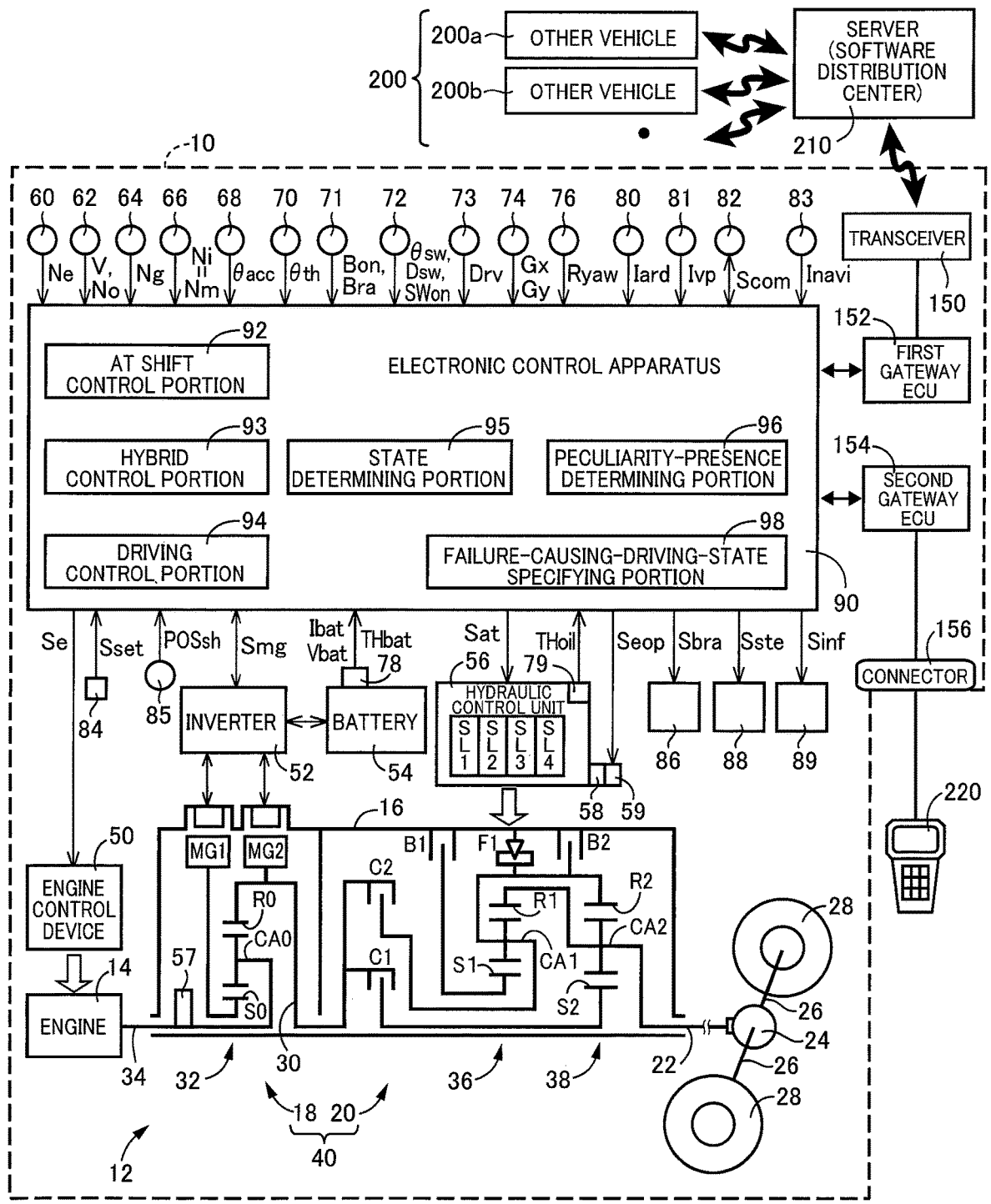
FIG. 1 is a view schematically showing a construction of a vehicle to which the present invention is applied, for explaining major portions of control functions and control systems that are provided to perform various control operations in the vehicle.

FIG. 1 is a view schematically showing a construction of a drive-force transmitting device 12 provided in a vehicle 10 to which the present invention is applied, for explaining major portions of control functions and control systems that are provided to perform various control operations in the vehicle 10. As shown in FIG. 1, the vehicle 10 includes an engine 14 and first and second rotating machines MG1, MG2. The drive-force transmitting device 12 includes a non-rotary member in the form of a transmission casing 16 that is attached to a body of the vehicle 10, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The drive-force transmitting device 12 further includes a differential gear device 24 connected to an output shaft 22 that is an output rotary member of the step-variable transmission portion 20, and a pair of axles 26 connected to the differential gear device 24. In the drive-force transmitting device 12, a drive force outputted from the engine 14 or the second rotating machine MG2 is transmitted to the step-variable transmission portion 20, and is then transmitted from the step-variable transmission portion 20 through the differential gear device 24 to drive wheels 28 of the vehicle 10, for example. The drive force is synonymous with a drive torque or a drive power unless otherwise distinguished from them. It is noted that the drive-force transmitting device 12 including the continuously-variable transmission portion 18 and the step-variable transmission portion 20 is constructed substantially symmetrically about its axis corresponding to the above-described common axis, so that a lower half of the drive-force transmitting device 12 is not shown in FIG. 1. The above-described common axis corresponds to axes of a crank shaft of the engine 14 and a connecting shaft 34 that is described below.

The engine 14 is a known internal combustion engine such as gasoline engine and diesel engine, which serves as a drive force source capable of generating a drive torque. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 14, is controlled. In the present embodiment, the engine 14 is connected to the continuously-variable transmission portion 18, without a fluid transmitting device (such as a torque converter and a fluid coupling device) disposed therebetween.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by the electronic control apparatus 90 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration, with the each of the first and second rotating machines MG1, MG2 being rotated in a forward direction. The output torque of each of the first and second rotating machines MG1, MG2 serves as a regenerative torque when acting as a negative torque for deceleration, with the each of the first and second rotating machines MG1, MG2 being rotated in the forward direction. The battery 54 is the electric storage device to and from which an electric power is supplied from and to the first rotating machine MG1 and the second rotating machine MG2.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmitting member 30 that is an output rotary member of the continuously-variable transmission portion 18; and a second rotating machine (second motor/generator) MG2 connected to the intermediate transmitting member 30 in a drive-force transmittable manner. The continuously-variable transmission portion 18 is an electrically-controlled continuously-variable transmission wherein a differential state of the differential mechanism 32 is controllable by controlling an operation state of the first rotating machine MG1. The first rotating machine MG1 serves as a differential rotating machine capable of controlling an engine rotational speed Ne that is a rotational speed of the engine 14. The second rotating machine MG2 serves as a vehicle-driving rotating machine, i.e., a drive force source capable of generating a drive torque driving the vehicle 10. The vehicle 10 is a hybrid vehicle provided with the drive force sources in the form of the engine 14 and the second rotating machine MG2. The drive force of each of the drive forces is to be transmitted to the drive wheels 28 through the drive-force transmitting device 12. It is noted that an operation of the first rotating machine MG1 is controlled by controlling an operation state of the first rotating machine MG1.

The differential mechanism 32 is a planetary gear device of a single-pinion type having a sun gear S0, a carrier CA0 and a ring gear R0. The carrier CA0 is connected to the engine 14 through the connecting shaft 34 in a drive-force transmittable manner, and the sun gear S0 is connected to the first rotating machine MG1 in a drive-force transmittable manner, while the ring gear R0 is connected to the second rotating machine MG2 in a drive-force transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated transmission mechanism which constitutes a part of a drive-force transmitting path between the intermediate transmitting member 30 and the drive wheels 28, namely, constitutes a part of a drive-force transmitting path between the continuously-variable transmission portion 18 and the drive wheels 28. The intermediate transmitting member 30 also serves as an input rotary member of the step-variable transmission portion 20. The step-variable transmission portion 20 is considered to also as a vehicle transmission constituting a part of a drive-force transmitting path between the drive force source (second rotating machine MG2 or engine 14) and the drive wheels 28, since the second rotating machine MG2 is connected to the intermediate transmitting member 30 such that the intermediate transmitting member 30 is rotated together with the second rotating machine MG2, or since the engine 14 is connected to an input rotary member of the continuously-variable transmission portion 18. The intermediate transmitting member 30 is a transmitting member through which the drive force of the drive force source is to be transmitted to the drive wheels 28. The step-variable transmission portion 20 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as engagement devices CB unless otherwise specified.

Each of the engagement devices CB is a hydraulically operated frictional engagement device in the form of a multiple-disc type or a single-disc type clutch or brake that is to be pressed by a hydraulic actuator, or a band brake that is to be tightened by a hydraulic actuator. The engagement devices CB are selectively placed in engaged, slipped or released states as the operation states with hydraulic pressures Pc1, Pc2, Pb1, Pb2 (see FIG. 4) as regulated pressures supplied from a hydraulic control unit (hydraulic control circuit) 56 provided in the vehicle 10. Thus, the hydraulic pressures Pc1, Pc2, Pb1, Pb2 are hydraulic pressures supplied to the step-variable transmission portion 20.

In the step-variable transmission portion 20, selected ones of rotary elements of the first and second planetary gear devices 36, 38 are connected to each other or to the intermediate transmitting member 30, casing 16 or output shaft 22, either directly or indirectly (selectively) through the engagement devices CB or a one-way clutch F1. The rotary elements of the first planetary gear device 36 are a sun gear S1, a carrier CA1 and a ring gear R1. The rotary elements of the second planetary gear device 38 are a sun gear S2, a carrier CA2 and a ring gear R2.

The step-variable transmission portion 20 is shifted to a selected one of a plurality of AT gear positions (speed positions) by engaging actions of selected ones of the engagement devices CB. The plurality of AT gear positions have respective different gear ratios (speed ratios) γat (=AT input rotational speed Ni/AT output rotational speed No). Namely, the step-variable transmission portion 20 is shifted up and down from one gear position to another by placing selected ones of the engagement devices in the engaged state. The step-variable transmission portion 20 is a step-variable automatic transmission configured to establish a selected one a plurality of gear positions. In the following description of the present embodiment, the gear position established in the step-variable transmission portion 20 will be referred to as AT gear position. The AT input rotational speed Ni is an input rotational speed of the step-variable transmission portion 20 that is a rotational speed of the input rotary member of the step-variable transmission portion 20, which is equal to a rotational speed of the intermediate transmitting member 30, and which is equal to an MG2 rotational speed Nm that is an rotational speed of the second rotating machine MG2. Thus, the AT input rotational speed Ni can be represented by the MG2 rotational speed Nm. The AT output rotational speed No is a rotational speed of the output shaft 22 that is an output rotational speed of the step-variable transmission portion 20, which is considered to be an output speed of a transmission device (composite transmission) 40 which consists of the continuously-variable transmission portion 18 and the step-variable transmission portion 20. The transmission device 40 is a transmission that constitutes a part of a drive-force transmitting path between the engine 14 and the drive wheels 28.

As shown in a table of FIG. 2, the step-variable transmission portion 20 is configured to establish a selected one of a plurality of AT gear positions in the form of four forward AT gear positions and a reverse AT gear position. The four forward AT gear positions consist of a first speed AT gear position, a second speed AT gear position, a third speed AT gear position and a fourth speed AT gear position, which are represented by "1st", "2nd", "3rd" and "4th" in the table of FIG. 2. The first speed AT gear position is the lowest-speed gear position having a highest gear ratio γat, while the fourth speed AT gear position is the highest-speed gear position having a lowest gear ratio γat. The gear ratio γat decreases in the direction from the first speed AT gear position (lowest-speed gear position) toward the fourth speed AT gear position (highest-speed gear position). The reverse AT gear position is represented by "Rev" in the table of FIG. 2, and is established by, for example, engagements of the clutch C1 and the brake B2. That is, when the vehicle 10 is to run in reverse direction, the first speed AT gear position is established, for example, as described below. The table of FIG. 2 indicates a relationship between each of the AT gear positions of the step-variable transmission portion 20 and operation states of the respective engagement devices CB of the step-variable transmission portion 20, namely, a relationship between each of the AT gear positions and a combination of ones of the engagement devices CB, which are to be placed in theirs engaged states to establish the each of the AT gear positions. In the table of FIG. 2, "◯" indicates the engaged state of the engagement devices CB, "Δ" indicates the engaged state of the brake B2 during application of an engine brake to the vehicle 10 or during a coasting shift-down action of the step-variable transmission portion 20, and the blank indicates the released state of the engagement devices CB.

The step-variable transmission portion 20 is configured to switch from one of the AT gear positions to another one of the AT gear positions, namely, to establish one of the AT gear positions which is selected, by the electronic control apparatus 90, according to, for example, an accelerating operation made by a vehicle driver (operator) and the vehicle running speed V. The step-variable transmission portion 20 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB. In the following description of the present embodiment, a shift down action from the second speed AT gear position to the first speed AT gear position will be referred to as shift down action from 2nd to 1st. The other shift down and up actions will be referred in the same way.

The vehicle 10 further includes an MOP 57 that is a mechanically-operated oil pump and an EOP 58 that is an electrically-operated oil pump. The MOP 57 is connected to the connecting shaft 34, and is to be rotated together with rotation of the engine 14, so as to output a working fluid OIL that is to be used in the drive-force transmitting device 12. The EOP 58 is to be orated by a motor 59 which is provided in the vehicle 10 and which serves exclusively for the EOP 58, so as to output the working fluid OIL. The working fluid OIL outputted by the MOP 57 and the EOP 58 is used for switching the operation state of each of the engagement devices CB in the step-variable transmission portion 20.

Figure 3:
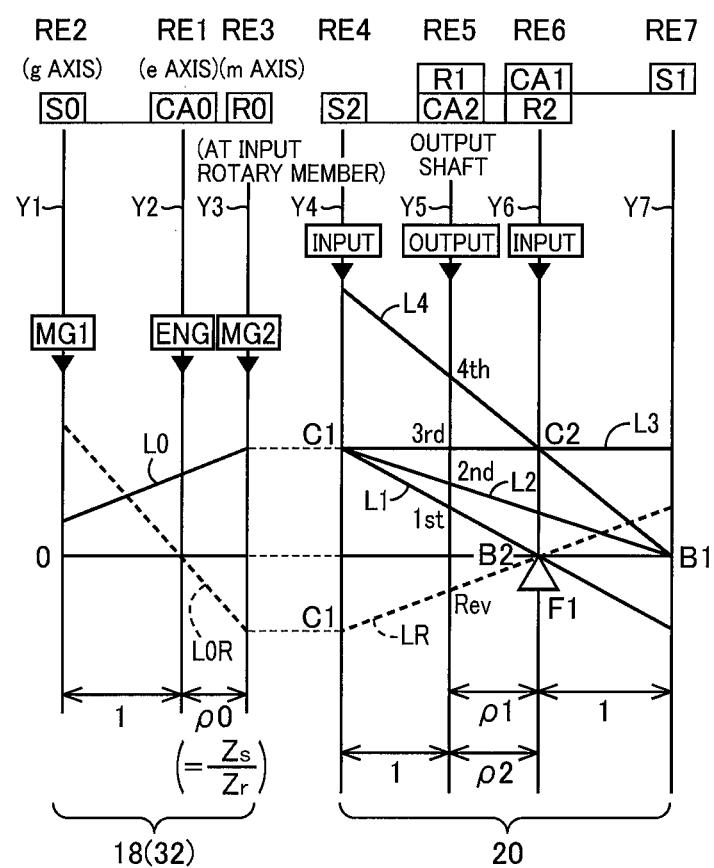
FIG. 3 is a collinear chart indicating a relationship among rotational speeds of rotary elements of an electrically-controlled continuously-variable transmission portion and the mechanically-operated step-variable transmission portion.

FIG. 3 is a collinear chart representative of a relative relationship of rotational speeds of the rotary elements in the continuously-variable transmission portion 18 and the step-variable transmission portion 20. In FIG. 3, three vertical lines Y1, Y2, Y3 corresponding to the three rotary elements of the differential mechanism 32 constituting the continuously-variable transmission portion 18 are a g-axis representative of the rotational speed of the sun gear S0 corresponding to a second rotary element RE2, an e-axis representative of the rotational speed of the carrier CA0 corresponding to a first rotary element RE1, and an m-axis representative of the rotational speed of the ring gear R0 corresponding to a third rotary element RE3 (i.e., the input rotational speed of the step-variable transmission portion 20) in order from the left side. Four vertical lines Y4, Y5, Y6, Y7 of the step-variable transmission portion 20 are axes respectively representative of the rotational speed of the sun gear S2 corresponding to a fourth rotary element RE4, the rotational speed of the ring gear R1 and the carrier CA2 connected to each other and corresponding to a fifth rotary element RE5 (i.e., the rotational speed of the output shaft 22), the rotational speed of the carrier CA1 and the ring gear R2 connected to each other and corresponding to a sixth rotary element RE6, and the rotational speed of the sun gear S1 corresponding to a seventh rotary element RE7 in order from the left. An interval between the vertical lines Y1, Y2, Y3 is determined in accordance with a gear ratio $\rho 0$ of the differential mechanism 32. An interval between the vertical lines Y4, Y5, Y6, Y7 is determined in accordance with gear ratios $\rho 1$, $\rho 2$ of the first and second planetary gear devices 36, 38. When an interval between the sun gear and the carrier is set to an interval corresponding to "1" in the relationship between the vertical axes of the collinear chart, an interval corresponding to the gear ratio $\rho$(=the number Zs of teeth of the sun gear/the number Zr of teeth of the ring gear) of the planetary gear device is set between the carrier and the ring gear.

In representation using the collinear chart of FIG. 3, in the differential mechanism 32 of the continuously-variable transmission portion 18, the engine 14 (see "ENG" in FIG. 3) is connected to the first rotary element RE1; the first rotating machine MG1 (see "MG1" in FIG. 3) is connected to the second rotary element RE2; the second rotating machine MG2 (see "MG2" in FIG. 3) is connected to the third rotary element RE3 that is to be rotated integrally with the intermediate transmitting member 30; and therefore, the rotation of the engine 14 is transmitted via the intermediate transmitting member 30 to the step-variable transmission portion 20. In the continuously-variable transmission portion 18, the relationship between the rotational speed of the sun gear S0 and the rotational speed of the ring gear R0 is indicated by straight lines L0 and L0R crossing the vertical line Y2.

In the step-variable transmission portion 20, the fourth rotary element RE4 is selectively connected through the clutch C1 to the intermediate transmitting member 30; the fifth rotary element RE5 is connected to the output shaft 22; the sixth rotary element RE6 is selectively connected through the clutch C2 to the intermediate transmitting member 30 and selectively connected through the brake B2 to the casing 16; and the seventh rotary element RE7 is selectively connected through the brake B1 to the casing 16. In the step-variable transmission portion 20, the rotational speeds of "1st", "2nd", "3rd", "4th", and "Rev" of the output shaft 22 are indicated by respective straight lines L1, L2, L3, L4, LR crossing the vertical line Y5 in accordance with engagement/release control of the engagement devices CB.

The straight line L0 and the straight lines L1, L2, L3, L4 indicated by solid lines in FIG. 3 indicate the relative speeds of the rotary elements during forward running in a hybrid running mode enabling a hybrid running in which at least the engine 14 is used as the drive force source for driving the vehicle 10. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 32, an engine direct transmission torque $Td[=Te/(1+\rho 0)=-(1/\rho 0) \times Tg]$ appears in the ring gear R0 as a positive torque in positive rotation. A combined torque of the engine direct transmission torque Td and the MG2 torque Tm is transmitted as the drive torque of the vehicle 10 in the forward direction depending on a required drive force to the drive wheels 28 through the step-variable transmission portion 20 having any AT gear position formed out of the AT first to AT fourth gear positions. In this case, the first rotating machine MG1 functions as an electric generator generating a negative torque in positive rotation. A generated electric power Wg of the first rotating machine MG1 is stored in the battery 54 or consumed by the second rotating machine MG2. The second rotating machine MG2 outputs the MG2 torque Tm by using all or a part of the generated electric power Wg or using the electric power from the battery 54 in addition to the generated electric power Wg.

In the differential mechanism 32 during a motor drive mode in which the vehicle 10 is driven with a drive force generated by the second motor/generator MG2 operated as a drive power source while the engine 14 is stopped (held at rest), the carrier CA0 is held stationary while the MG2 torque Tm that is a positive torque is applied to the ring gear R0 and rotating the ring gear R0 in the positive direction. The state of the differential mechanism 32 in this motor drive mode is not shown in the collinear chart of FIG. 3. At this time, the first motor/generator MG1 connected to the sun gear S0 is placed in a non-load state and freely rotatable in the negative direction. Namely, in the motor drive mode, the engine 14 is held in its non-operated state, so that an rotating speed $\omega e$ of the engine 14 (engine rotating speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions. During the forward running in the motor running mode, the MG2 torque Tm is a power running torque that is a positive torque in positive rotation.

The straight lines L0R and LR indicated by broken lines in FIG. 3 indicate the relative speeds of the rotary elements in reverse running in the motor running mode. During reverse running in this motor running mode, the MG2 torque Tm is inputted to the ring gear R0 as a negative torque in negative rotation, and the MG2 torque Tm is transmitted as the drive torque of the vehicle 10 in a reverse direction to the drive wheels 28 through the step-variable transmission portion 20 in which the AT first gear position is established. The vehicle 10 can perform the reverse running when the electronic control apparatus 90 causes the second rotating machine MG2 to output a reverse MG2 torque Tm having a positive/negative sign opposite to a forward MG2 torque Tm during forward running while a forward low-side AT gear position, for example, the AT first gear position, is established as one the plurality of AT gear positions. During the reverse running in the motor running mode, the MG2 torque Tm is a power running torque that is a negative torque in negative rotation. In this case, the forward MG2 torque Tm is a power running torque that is a positive torque in positive direction, and the reverse MG2 torque Tm is a power running torque that is a negative torque in negative direction. In this way, the vehicle 10 performs the reverse running by inverting positiveness/negativeness of the MG2 torque Tm with the forward AT gear position. Using the forward AT gear position means using the same AT gear position as when the forward running is performed. Even in the hybrid running mode, the reverse running can be performed as in the motor running mode since the second rotating machine MG2 can be rotated in negative direction as indicated by the straight line L0R.

In the drive-force transmitting device 12, the continuously-variable transmission portion 18 constitutes an electric transmission mechanism that includes the differential mechanism 32 having three rotary elements, wherein the three rotary elements consist of the first rotary element RE1 in the form of the carrier CA0 to which the engine 14 is connected in a drive-force transmittable manner, the second rotary element RE2 in the form of the sun gear S0 to which the first rotating machine MG1 is connected in a drive-force transmittable manner, and the third rotary element RE3 in the form of the ring gear R0 to which the intermediate transmitting member 30 is connected, and wherein the differential state of the differential mechanism 32 is controlled by controlling the operation state of the first rotating machine MG1. From another viewpoint, the third rotary element RE3 having the intermediate transmitting member 30 connected thereto is the third rotary element RE3 to which the second rotating machine MG2 is connected in a drive-force transmittable manner. That is, in the drive-force transmitting device 12, the continuously-variable transmission portion 18 has the differential mechanism 32 to which the engine 14 is connected in a drive-force transmittable manner and the first rotating machine MG1 connected to the differential mechanism 32 in a drive-force transmittable manner, such that the differential state of the differential mechanism 32 is controlled by controlling the operation state of the first rotating machine MG1. The continuously-variable transmission portion 18 is operated as an electric continuously variable transmission driven to change a gear ratio $\gamma 0$ (=Ne/Nm) that is a ratio of the engine rotational speed Ne to the MG2 rotational speed Nm, wherein the engine rotational speed Ne is equal to the rotational speed of the connecting shaft 34 serving as an input rotary member of the continuously-variable transmission portion 18 while the MG2 rotational speed Nm is equal to the rotational speed of the intermediate transmitting member 30 serving as an output rotating member of the continuously-variable transmission portion 18.

For example, in the hybrid running mode, when the rotational speed of the sun gear S0 is increased or reduced by controlling the rotational speed of the first rotating machine MG1 relative to the rotational speed of the ring gear R0 that is restrained by the rotation of the drive wheels 28 since one of the AT gear positions is established in the step-variable transmission portion 20, the rotational speed of the carrier CA0, i.e., the engine rotational speed Ne, is increased or reduced. Therefore, in the hybrid running, the engine 14 can be operated at an efficient operating point. Thus, a continuously variable transmission can be constituted by cooperation of the step-variable transmission portion 20 having one of the AT gear position is established therein and the continuously-variable transmission portion 18 operated as a continuously variable transmission, as the whole of the transmission device 40 in which the continuously-variable transmission portion 18 and the step-variable transmission portion 20 are arranged in series.

Alternatively, since a shifting operation can be performed in the continuously-variable transmission portion 18 as in a step-variable transmission, a shifting operation can be performed as in a step-variable transmission by using the step-variable transmission portion 20 having one of the AT gear positions established therein and the continuously-variable transmission portion 18 in which a shifting operation is performed as in a step-variable transmission, as the whole of the transmission device 40. In other words, in the transmission device 40, the step-variable transmission portion 20 and the continuously-variable transmission portion 18 can be controlled so as to selectively establish a plurality of gear positions that are different in the gear ratio $\gamma t$ (=Ne/No) indicative of the ratio of the engine rotational speed Ne to the output rotational speed No. In the present embodiment, the gear position established in the transmission device 40 is referred to as an overall speed position (although it may be referred also to as a conceptual speed position). The gear ratio $\gamma t$ is an overall gear ratio of the transmission device 40 consisting of the continuously-variable transmission portion 18 and the step-variable transmission portion 20 which are disposed in series with each other. The overall gear ratio $\gamma t$ is equal to a product of the gear ratio $\gamma 0$ of the continuously-variable transmission portion 18 and the gear ratio $\gamma at$ of the step-variable transmission portion 20, namely, $\gamma t = \gamma 0 \times \gamma at$.

For example, the overall speed position is assigned such that one or more types are established for each of the AT gear positions of the step-variable transmission portion 20 by combining the AT gear positions of the step-variable transmission portion 20 with one or more types of the gear ratio $\gamma 0$ of the continuously-variable transmission portion 18. For example, the overall speed position is defined in advance such that first through third overall speed positions are established for the first speed AT gear position, the fourth through sixth overall speed positions are established for the second speed AT gear position, seventh through ninth overall speed positions are established for the third speed AT gear position, and the tenth overall speed position is established for the fourth speed AT gear position. In the transmission device 40, the continuously-variable transmission portion 18 is controlled to attain the engine rotational speed Ne by which a desired gear ratio γt is established for the output rotational speed No, so that different speed positions are established with a certain AT gear position being established in the step-variable transmission portion 20. Further, in the transmission device 40, the continuously-variable transmission portion 18 is controlled with switching of the AT gear position in the step-variable transmission portion 20 whereby the overall speed position is switched.

Referring back to FIG. 1, the vehicle 10 is provided with the electronic control apparatus 90 as a controller including the control apparatus which is constructed according to present invention and which is configured to control, for example, the engine 14, continuously-variable transmission portion 18 and step-variable transmission portion 20. FIG. 1 is a view showing an input/output system of the electronic control apparatus 90, and is a functional block diagram for explaining major control functions and control portions if the electronic control apparatus 90. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 60 indicative of an engine rotational speed Ne which is a rotational speed of the engine 14; an output signal of an output speed sensor 62 indicative of an output-shaft rotational speed No which is a rotational speed of the output shaft 22 and which corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of an MG2 rotational speed Nm which is a rotational speed of the second rotating machine MG2 and which corresponds to an AT input rotational speed Ni; an output signal of an accelerator-opening degree sensor 68 indicative of an acceleration opening degree θacc representing an amount of accelerating operation made by the vehicle driver; an output signal of a throttle-opening degree sensor 70 indicative of a throttle opening degree θth; an output signal of a brake pedal sensor 71 indicative of a brake-ON signal Bon representing a state of depression of a brake pedal by the vehicle driver to operate wheel brakes and also a braking operation amount Bra representing an amount of depression of the brake pedal by the vehicle driver corresponding to a depressing force applied to the brake pedal; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a driver condition sensor 73 indicative of a driver condition signal Drv representing a condition of the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current Ibat and a voltage Vbat of the battery 54; an output signal of a fluid temperature sensor 79 indicative of a working fluid temperature THoil that is a temperature of the working fluid OIL; an output signal of a vehicle-area information sensor 80 indicative of vehicle area information Iard; an output signal of a vehicle location sensor 81 indicative of location information Ivp; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and a cruise control; and an output signal of a shift position sensor 85 indicative of an operation position POSsh of a shift lever provided in the vehicle 10.

The amount of accelerating operation made by the vehicle driver is, for example, an amount of operation of an acceleration operating member such as an accelerator pedal, and corresponds to a required output amount that is an amount of output of the vehicle 10 required by the vehicle driver. As the required output amount required by the vehicle driver, the throttle opening degree θth can be used in addition to or in place of the accelerator operation degree θacc, for example.

The driver condition sensor 73 includes a camera configured to photograph, for example, a facial expression and pupils of eyes of the vehicle driver and/or a biometric information sensor configured to detect biometric information of the vehicle driver, so as to detect or obtain directions of his or her eyes and face, movements of his or her eye balls and face and condition of his or her heartbeat, for example.

The vehicle-area information sensor 80 includes a lidar (Light Detection and Ranging), a radar (Radio Detection and Ranging) and/or an onboard camera, for example, so as to directly obtain information relating to a road on which the vehicle 10 is running and information relating to an object or objects present around the vehicle 10. The lidar is constituted by, for example, a plurality of lidar units configured to detect objects present in the respective front, lateral and rear sides of the vehicle 10, or a single lidar unit configured to detect objects present all around the vehicle 10. The lidar is configured to output, as the vehicle area information Iard, object information that is information relating to the detected object or objects. The radar is constituted by, for example, a plurality of radar units configured to detect objects present in the respective front, front vicinity and rear vicinity of the vehicle 10, and to output, as the vehicle area information Iard, object information that is information relating to the detected object or objects. The objected information outputted as the vehicle area information Iard by the lidar and the radar includes a distance and a direction of each of the detected objects from the vehicle 10. The onboard camera is, for example, a monocular camera or a stereo camera configured to capture images of front and rear sides of the vehicle 10, and to output, as the vehicle area information Iard, captured image information that is information relating to the captured images. The captured image information outputted as the vehicle area information Iard by the onboard camera includes information relating to lanes of a running road, signs and parking spaces present on the running road, and at least one other vehicle 200, pedestrians and obstacles present on the running road. The at least one other vehicle 200 may consist of a plurality of other vehicles 200a, 200b, and each of the at least one other vehicle 200 has substantially the same functions as the vehicle 10.

The vehicle location sensor 81 includes a GPS antenna. The location information Ivp outputted by the vehicle location sensor 81 includes own-vehicle location information indicating a location of the vehicle 10 on the earth's surface or a map based on, for example, GPS signals (Orbit signals) transmitted by GPS (Global Positioning System) satellites.

The navigation system 83 is a known navigation system including a display and a speaker, and is configured to specify a location of the vehicle 10 on pre-stored map data, based on the location information Ivp, and to indicate the location of the vehicle 10 on the map displayed on the display. The navigation system 83 receives a destination point inputted thereto, calculates a running route from a departure point to the destination point, and informs, as instructions, the vehicle driver of the running route, for example, through the display and the speaker. The navigation information Inavi includes map information such as road information and facility information that are based on the map data pre-stored in the navigation system 83. The road information includes information relating to types of roads (such as urban roads, suburban roads, mountain roads and highway load), branching and merging of roads, road gradients, and running speed limits. The facility information includes information of types, locations, names of sites such as supermarkets, shops, restaurants, parking lots, parks, places for repairing the vehicle 10, a home of vehicle's owner and service areas located on the highway load. The service areas are sites which are located on, for example, the highway load, and in which there are facilities for parking, eating, and refueling.

The drive-assist setting switches 84 include an automatic-drive selecting switch for executing the automatic drive control, a cruise switch for executing the cruise control, a switch for setting the vehicle running speed in execution of the cruise control, a switch for setting a distance from another vehicle preceding the vehicle 10 in execution of the cruise control, and a switch for executing a lane keeping control for keeping the vehicle 10 to run within a selected road lane.

The communication signal Scom includes road traffic information that is transmitted and received to and from a center that is an external device such as a road traffic information communication system, and/or inter-vehicle communication information that is directly transmitted and received to and from the at least one other vehicle 200 present in the vicinity of the vehicle 10 without via the center. The road traffic information includes information relating to traffic jams, accidents, road constructions, required travel times, and parking lots on roads. The inter-vehicle communication information includes vehicle information, running information, traffic environment information. The vehicle information includes information indicative of a vehicle type of the at least one other vehicle 200 such as passenger vehicle, truck, and two-wheel vehicle. The running information includes information relating to the at least one other vehicle 200 such as information indicative of the vehicle speed V, location information, brake-pedal operation information, turn-signal-lamp blinking information, and hazard-lamp blinking information. The traffic environment information includes information relating to traffic jams and road constructions.

The electronic control apparatus 90 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; hydraulic control command signal Sat that is to be supplied to the hydraulic control unit 56 for controlling the operation states of the engagement devices CB; an EOP control command signal Seop that is to be supplied to the motor 59 for controlling operation of the EOP 58; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 88, for controlling steering of wheels (especially, front wheels) of the vehicle 10; and an information-notification-control command signal Sinf that is to be supplied to an information notification device 89, for warning and notifying information to the vehicle driver. The hydraulic control command signal Sat serves also as hydraulic control command signals for controlling shifting actions of the step-variable transmission portion 20, wherein the hydraulic control command signals are provided, for example, for operating solenoid valves SL1, SL2, SL3, SL4 (see FIG. 4 described below) configured to regulate respective hydraulic pressures Pc1, Pc2, Pb1, Pb2 that are to be supplied to hydraulic actuators of the respective engagement devices CB. The electronic control apparatus 90 is configured to set hydraulic command values corresponding to the respective hydraulic pressures Pc1, Pc2, Pb1, Pb2, and to supply drive currents or drive voltages corresponding to the respective hydraulic command values, to the hydraulic control unit 56.

The wheel brake device 86 is a brake device including wheel brakes each of which is configured to apply a braking torque to a corresponding one of the wheels that include the drive wheels 28 and driven wheels (not shown). The wheel brake device 86 supplies a brake hydraulic pressure to a wheel cylinder provided in each of the wheel brakes in response to a depressing operation of the brake pedal by the vehicle driver, for example. In the wheel brake device 86, normally, a brake master cylinder is configured to generate a master-cylinder hydraulic pressure whose magnitude corresponds to the braking operation amount Bra, and the generated master-cylinder hydraulic pressure is supplied as the brake hydraulic pressure to the wheel cylinder. On the other hand, in the wheel brake device 86, for example, during execution of an ABS control, an anti-skid control, a vehicle-running-speed control or an automatic drive control, the brake hydraulic pressure required for execution of such a control is supplied to the wheel cylinder for enabling the wheel cylinder to generate the required braking torque.

The steering device 88 is configured to apply an assist torque to a steering system of the vehicle 10 in accordance with the vehicle running speed V, steering angle θsw, steering direction Dsw and yaw rate Ryaw, for example. For example, during execution of the automatic driving control, the steering device 88 applies a torque for controlling the steering of the front wheels, to the steering system of the vehicle 10.

The information notification device 89 is configured to give a warning or notification to the vehicle driver in even of a failure in some components involved in the running of the vehicle 10 or deterioration in the functions of the components, for example. The information notification device 89 is constituted by, for example, a display device such as a monitor, a display and an alarm lamp, and/or a sound output device such as a speaker and a buzzer. The display device is configured to visually give a warning or notification to the vehicle driver. The sound output device is configured to aurally give a warning or notification to the vehicle driver.

Figure 4:
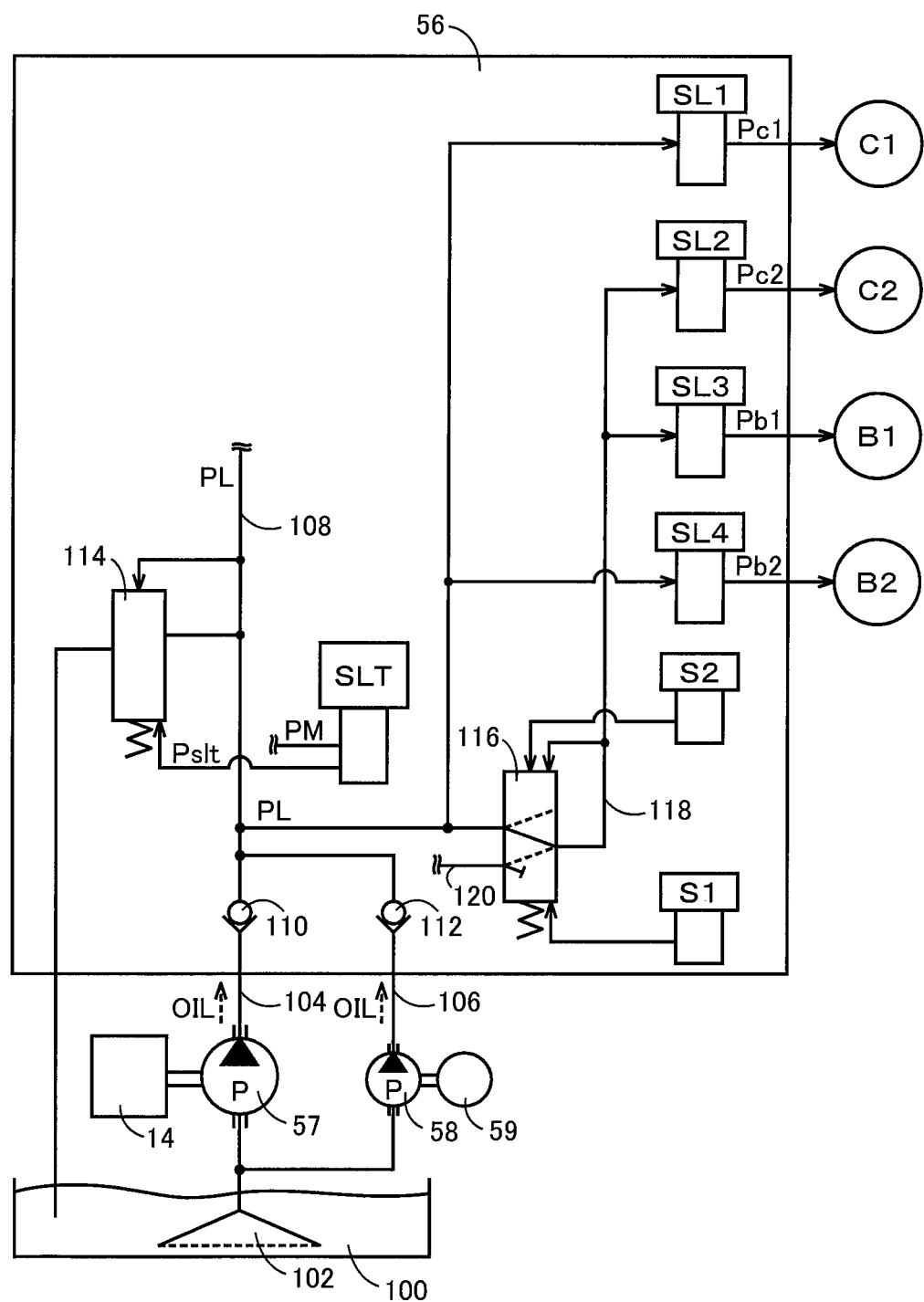
FIG. 4 is a view for explaining a hydraulic control unit and a hydraulic source that is configured to supply a working fluid to the hydraulic control unit.

FIG. 4 is a view for explaining the hydraulic control unit 56 and a hydraulic source that is configured to supply the working fluid OIL to the hydraulic control unit 56. As shown in FIG. 4, the MOP 57 and the EOP 58 are provided in parallel with each other in a hydraulic circuit in which the working fluid OIL is caused to flow. The MOP 57 and EOP 58 are configured to output the working fluid OIL serving as original hydraulic pressures for switching an operation state of each of the engagement devices CB and as lubricant fluids for lubricating various parts of the drive-force transmitting device 12. The MOP 57 and EOP 58 pump up the working fluid OIL returned into an oil pan 100 that is disposed in a lower portion of the casing 16, through a strainer 102 as an inlet port that is common to the MOP 57 and EOP 58, and supply the working fluid OIL to respective fluid delivery passages 104, 106. The fluid delivery passages 104, 106 are connected to a fluid passage of the hydraulic control unit 56, for example, connected to a line-pressure fluid passage 108 through which a line pressure PL is caused to flow. The fluid delivery passage 104, to which the working fluid OIL is to be supplied from the MOP 57, is connected to the line-pressure fluid passage 108 through an MOP check valve 110 that is provided in the hydraulic control unit 56. The fluid delivery passage 106, to which the working fluid OIL is to be supplied from the EOP 58, is connected to the line-pressure fluid passage 108 through an EOP check valve 112 that is provided in the hydraulic control unit 56. The MOP 57 generates a working hydraulic pressure by being rotated together with rotation of the engine 14. The EOP 58 generates a working hydraulic pressure by being rotated by the motor 59, and is capable of generating the working hydraulic pressure, irrespective whether the engine 14 is rotated or not. The EOP 58 is operated to generate the working hydraulic pressure, for example, when the vehicle 10 runs in the motor running mode.

The hydraulic control unit 56 includes, in addition to the above-described line-pressure fluid passage 108, MOP check valve 110 and EOP check valve 112, a regulator valve 114, a switch valve 116, a fluid supply passage 118, a fluid discharge passage 120 and solenoid valves SLT, S1, S2, SL1-SL4.

The regulator valve 114 regulates the line pressure PL that is the working fluid OIL supplied from at least one of the MOP 57 and EOP 58. The solenoid valve SLT, which is a linear solenoid valve, for example, is controlled by the electronic control apparatus 90, so as to supply, to the regulator valve 114, a pilot pressure Pslt that is dependent on, for example, the input torque applied to the step-variable transmission portion 20, whereby the line pressure PL is controlled to a pressure value dependent on, for example, the input torque applied to the step-variable transmission portion 20. The solenoid valve SLT is configured to receive an original pressure in the form of a modulator pressure PM having a certain pressure value, for example, to which the line pressure PL as an original pressure is regulated by a modulator valve (not shown).

The switch valve 116 is configured to establish one of fluid passages that is selected based on the hydraulic pressures supplied from the solenoid valves S1, S2. Each of the solenoid valves S1, S2 is, for example, an ON-OFF solenoid valve, and is controlled by the electronic control apparatus 90, so as to supply the hydraulic pressure to the switch valve 116. When the hydraulic pressure is supplied from the solenoid valve S2 without the hydraulic pressure being supplied from the solenoid valve S1, the switch valve 116 establishes a fluid passage that connects between the line-pressure fluid passage 108 and the fluid supply passage 118. When the hydraulic pressures are supplied from both of the solenoid valve S1 and the solenoid valve S2 or supplied from neither the solenoid valve S1 nor the solenoid valve S2, or when the hydraulic pressure is supplied from the solenoid valve S1 without the hydraulic pressure being supplied from the solenoid valve S2, the switch valve 116 establishes a fluid passage that connects between the fluid discharge passage 120 and the fluid supply passage 118 while blocking the fluid passage between the line-pressure fluid passage 108 and the fluid supply passage 118. The fluid supply passage 118 is a fluid passage through which the hydraulic pressure inputted to each of the solenoid valves SL2, SL3 is caused to flow. The fluid discharge passage 120 is an atmosphere-opening passage through which the working fluid OIL is discharged from the hydraulic control unit 56 toward outside the hydraulic control unit 56, namely, through which the working fluid OIL is returned to the oil pan 100. When the operation position POSsh is a D position selecting a forward running position of the transmission device 40 that enables a forward running of the vehicle 10, for example, the electronic control apparatus 90 supplies, to the hydraulic control unit 56, the hydraulic control command signal Sat which causes the solenoid valve S2 to output the hydraulic pressure and which causes the solenoid valve S1 not to output the hydraulic pressure. When the operation position POSsh is a R position selecting a reverse running position of the transmission device 40 that enables a reverse running of the vehicle 10, for example, the electronic control apparatus 90 supplies, to the hydraulic control unit 56, the hydraulic control command signal Sat which causes the solenoid valves S1, S2 to output the hydraulic pressures.

Each of the solenoid valves SL1-SL4 is, for example, a linear solenoid valve that is controlled by the electronic control apparatus 90, so as to output a corresponding one of the hydraulic pressures Pc1, Pc2, Pb1, Pb2 to a corresponding one of the engagement devices CB. The solenoid valve SL1 receives the line pressure PL as the original pressure and regulates the hydraulic pressure Pc1 that is supplied to the hydraulic actuator of the clutch C1. The solenoid valve SL2 receives the line pressure PL as the original pressure through the switch valve 116 and regulates the hydraulic pressure Pc2 that is supplied to the hydraulic actuator of the clutch C2. The solenoid valve SL3 receives the line pressure PL as the original pressure through the switch valve 116 and regulates the hydraulic pressure Pb1 that is supplied to the hydraulic actuator of the brake B1. The solenoid valve SL4 receives the line pressure PL as the original pressure and regulates the hydraulic pressure Pb2 that is supplied to the hydraulic actuator of the brake B2.

Figure 5:
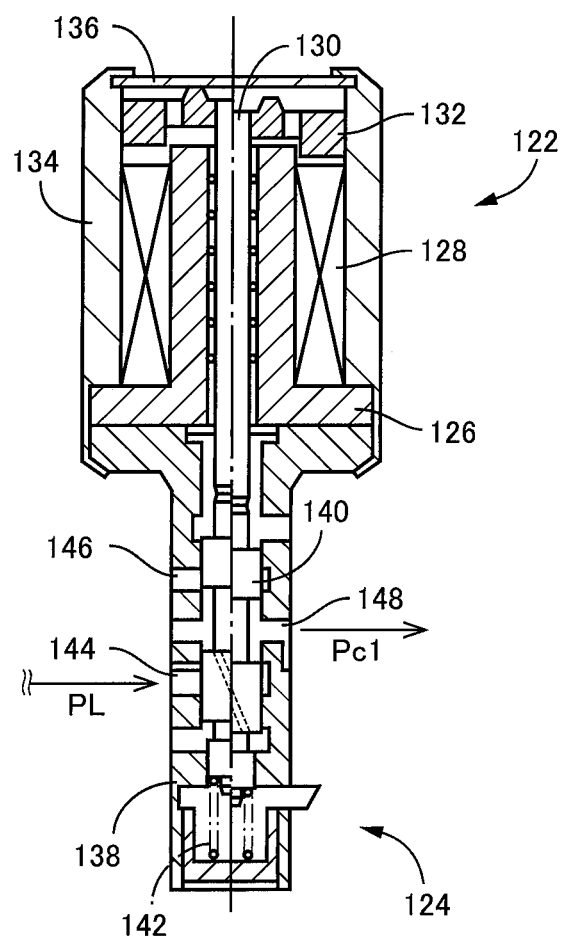
FIG. 5 is a cross sectional view for explaining a linear solenoid valve configured to regulate a hydraulic pressure supplied to a corresponding one of the engagement devices provided in the hydraulic control unit of FIG. 4.
Figure 6:
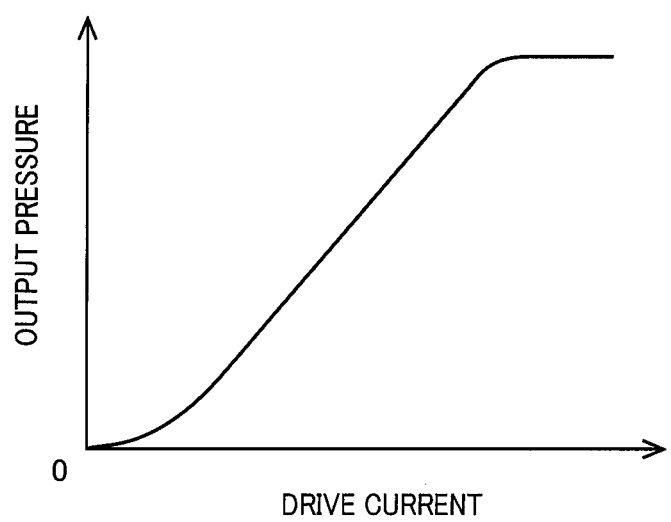
FIG. 6 is a view showing, by way of example, a valve characteristic of the linear solenoid valve of FIG. 5.

FIG. 5 is a cross sectional view for explaining a construction of each of the solenoid valves SL1-SL4. FIG. 5 shows, by way of example, the solenoid valve SL1 as one of the solenoid valves SL1-SL4 that are substantially identical in construction with one another. The solenoid valve SL1 includes a solenoid 122 configured, when being energized, to covert an electric energy into a drive force, and a regulator portion 124 configured, when being driven by the solenoid 122, to regulate the line pressure PL so as to generate the C1 hydraulic pressure Pc1. The solenoid 122 includes a cylindrical-tubular-shaped winding core 126, a coil 128 constituted by a conductor cable wound on a periphery of the winding core 126, a core 130 provided to be axially movable inside the winding core 126, a plunger 132 fixed to one of axially opposite end portions of the core 130 which is remote from the regulator portion 124, a casing 134 storing therein the winding core 126, coil 128, core 130 and plunger 132, and a cover 136 fitted in an opening of the casing 134. The regulator portion 124 includes a sleeve 138 fitted in the casing 134, a spool valve element 140 provided to be axially movable inside the sleeve 138, and a spring 142 constantly forces or biases the spool valve element 140 toward the solenoid 122. The spool valve element 140 is in contact, at one of axially opposite end portions which is on a side of the solenoid 122, with the other of the above-described axially opposite end portions of the core 130, namely, one of the above-described axially opposite end portions of the core 130, which is on a side of the regulator portion 124. In the solenoid valve SL1 constructed as described above, with the drive current being applied to the coil 128, the plunger 132 is moved by a distance that is dependent on an amount of the applied electric current, in an axial direction of the plunger 132, core 130 and spool valve element 140 that are coaxial with one another, and the core 130 and the spool valve element 140 are moved together with the plunger 132 in the axial direction. With the axial movement of the spool valve element 140, a rate of flow of the working fluid OIL introduced through an inlet port 144 and a rate of flow of the working fluid OIL discharged through a drain port 146 are adjusted, so that the line pressure PL inputted through the inlet port 144 is regulated in accordance with the valve characteristic of the linear solenoid valve SL1, which is a predetermined relationship, as shown in FIG. 6 by way of example, between the drive current and an output pressure that corresponds to the C1 hydraulic pressure Pc1 to which the line pressure PL is regulated. The C1 hydraulic pressure Pc1 as the output pressure is outputted through an outlet port 148.

Referring back to FIG. 1, the vehicle 10 further includes a transceiver 150, a first gateway ECU 152, a second gateway ECU 154 and a connector 156.

The transceiver 150 is a device configured to communicate with a server 210 as an external device which is present apart from the vehicle 10 and is provided outside the vehicle 10. The server 210 is a system present on a network outside the vehicle 10, and is configured to receive, process, analyze, store and supply various information such as vehicle state information and vehicle phenomenon information. The server 210 transmits and receives the various information to and from the above-described at least one other vehicle 200 as well as to and from the vehicle 10. However, the transceiver 150 may have a function of directly communicating with the at least one other vehicle 200 present in the vicinity of the vehicle 10 without via the server 210. It can be considered that the electronic control device 90 of the vehicle 10 cooperates with an electronic control device (which functionally corresponds to the electronic control device 90) of each of the at least one other vehicle 200, or with the server 210 and the electronic control device of each of the at least one other vehicle 200, to constitute a vehicle failure-factor specifying system in which the various information such as pre-failure data and non-failure data (that are described below) are shared with one another. The vehicle state information represents, for example, an operation or driving state relating to driving of the vehicle 10, which is detected by the various sensors or the like. This operation or driving state (hereinafter simply referred to as "driving state") is represented, for example, by the accelerator operation degree θacc and the vehicle running speed V. The vehicle phenomenon information represents, for example, phenomenons caused in the vehicle 10. These phenomenons are, for example, an acoustic pressure, i.e., a sound or noise inside the vehicle 10, which is detected by a microphone (not shown) and a vibration felt by the vehicle driver and passengers in the vehicle 10, which is detected by the G sensor 74. It is noted that the transceiver 150 may communicate with the server 210 via the external-network communication antenna 82 by a radio or wireless communication.

Each of the first and second gateway ECUs 152, 154 has substantially the same hardware construction as the electronic control apparatus 90, and is constituted by, for example, a relay device provided to rewrite programs and/or data stored in a rewritable ROM included in the electronic control apparatus 90. The first gateway ECU 152 is connected to the transceiver 150, and is configured to rewrite the programs stored in the ROM, for example, through the wireless communication between transceiver 150 and the server 210. The server 210 serves as a software distribution center configured to distribute programs for the rewriting. The second gateway ECU 154 is mechanically connectable through the connector 156 to an external rewriting device 220 as an external device that is present apart from the vehicle 10, and is configured to rewrite the programs stored in the ROM provided in the electronic control apparatus 90, for example, through the external rewriting device 220.

For performing various control operations in the vehicle 10, the electronic control apparatus 90 includes an AT shift control means or portion in the form of an AT shift control portion 92, a hybrid control means or portion in the form of a hybrid control portion 93 and a driving control means or portion in the form of a driving control portion 94.

Figure 7:
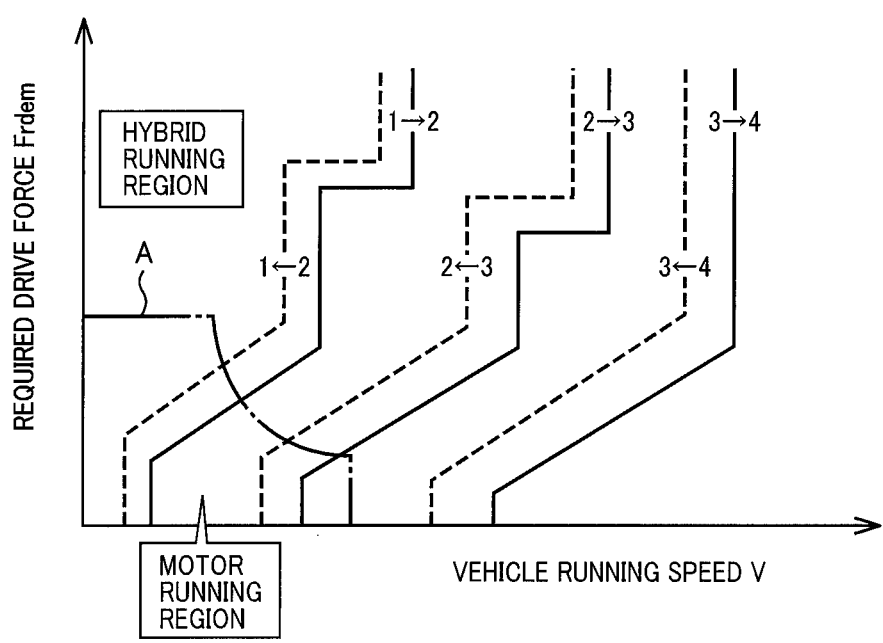
FIG. 7 is a view showing, by way of examples, a shifting map used for controlling gear shifting in the step-variable transmission portion, a drive-force-source switching map used for switching between a hybrid running and a motor running, and a relationship between the shifting map and the drive-force-source switching map.

The AT shift control portion 92 is configured to determine a shifting action of the step-variable transmission portion 20, by using, for example, an AT gear position shift map as shown in FIG. 7, which is a relationship obtained by experimentation or determined by an appropriate design theory, and outputs the hydraulic control command signal Sat supplied to the hydraulic control unit 56, so as to execute the shift control operation in the step-variable transmission portion 20 as needed. The AT gear position shifting map is a predetermined relationship between two variables in the form of the vehicle running speed V and the required drive force Frdem, for example, which relationship is used to determine a shifting action of the step-variable transmission portion 20 and is represented by shifting lines in two-dimensional coordinates in which the running speed V and the required drive force Frdem are taken along respective two axes. It is noted that one of the two variables may be the output rotational speed No in place of the vehicle running speed V and that the other of the two variables may be the required drive torque Trdem, accelerator opening degree θacc or throttle valve opening degree θth in place of the required drive force Frdem. The shifting lines in the AT gear position shifting map consist of shift-up lines (indicated by solid lines in FIG. 7) for determining a shift-up action of the step-variable transmission portion 20, and shift-down lines (indicated by broken lines in FIG. 7) for determining a shift-down action of the step-variable transmission portion 20.

The hybrid control portion 93 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The hybrid control portion 93 calculates a drive request amount in the form of the required drive force Frdem that is to be applied to the drive wheels 28, by applying the accelerator opening degree θacc and the vehicle running speed V to, for example, a drive request amount map that is a predetermined relationship. The required drive torque Trdem [Nm] applied to the drive wheels 28, a required drive power Prdem [W] applied to the drive wheels 28, a required AT output torque applied to the output shaft 22, etc. can be used as the drive request amount, in addition to the required drive force Frdem [N].

The hybrid control portion 93 outputs the engine control command signal Se for controlling the engine 14 and the rotating-machine control command signals Smg for controlling the first and second rotating machines MG1, MG2, by taking account of a maximum charging amount Win of electric power that can be charged to the battery 54, and a maximum discharging amount Wout of electric power that can be discharged from the battery 54, such that the required drive power Prdem based on the required drive torque Trdem and the vehicle running speed V is obtained. The engine control command signal Se is, for example, a command value of an engine power Pe that is the power of the engine 14 outputting the engine torque Te at the current engine rotation speed Ne. The rotating-machine control command signal Smg is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of command signal Smg output, and is a command value of a consumed electric power Wm of the second rotating machine MG2 outputting the MG2 torque Tm at the MG2 rotation speed Nm which is the MG2 rotation speed Nm at the time of command signal Smg output.

The maximum charging amount Win of the battery 54 is a maximum amount of the electric power that can be charged to the battery 54, while the maximum discharging amount Wout of the battery 54 is a maximum amount of the electric power that can be discharged from the battery 54. That is, the maximum charging and discharging amounts Win, Wout of the battery 54d define a range of an electric power Pbat of the battery 54 that can be used. The maximum charging and discharging amounts Win, Wout are calculated by the electronic control apparatus 90, for example, based on a battery temperature THbat and a charged state value SOC [%] of the battery 54. The charged state value SOC of the battery 54 is a value indicative of a charged state of the battery 54, i.e., an amount of the electric power stored in the battery 54, and is calculated by the electronic control apparatus 90, for example, based on the charging/discharging electric current Ibat and the voltage Vbat of the battery 54.

For example, when the transmission device 40 is operated as a continuously variable transmission as a whole by operating the continuously variable transmission portion 18 as a continuously variable transmission, the hybrid control portion 93 controls the engine 14 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 18 to change the gear ratio γ0 of the continuously variable transmission portion 18. As a result of this control, the gear ratio γt of the transmission device 40 is controlled in the case of operating the transmission device 40 as a continuously variable transmission.

For example, when the transmission device 40 is operated as a step-variable transmission as a whole by operating the continuously variable transmission portion 18 as in a step-variable transmission, the hybrid control portion 93 uses a predetermined relationship, for example, an overall speed position shift map, to determine a shifting action of the transmission device 40 and provides the shift control of the continuously variable transmission portion 18 so as to selectively establish the plurality of overall speed positions in coordination with the shift control of the AT gear position of the step-variable transmission portion 20 by the AT shift control portion 92. The plurality of overall speed positions can be established by controlling the engine rotational speed Ne by the first rotating machine MG1 in accordance with the vehicle speed V so as to maintain the respective gear ratios γt. The gear ratio γt of each of the overall speed positions may not necessarily be a constant value over the entire region of the vehicle speed V and may be changed in a predetermined region or may be limited by an upper limit, a lower limit, etc. of the rotational speed of each rotary member or element. As described above, the hybrid control portion 93 can provide the shift control in which the engine rotational speed Ne is changed as in a step-variable shift. An overall step-variable shift control of causing the transmission device 40 to perform a shift as in a step-variable transmission as a whole may be provided only in priority to the continuously variable shift control of operating the transmission device 40 as a continuously variable transmission as a whole in the case that, for example, the vehicle driver selects a running mode placing emphasis on running performance such as a sports running mode etc. or the required drive torque Trdem is relatively large; however, the overall step-variable shift control may basically be provided except when a predetermined restriction is placed on provision.

The hybrid control portion 93 selectively establishes the motor running mode or the hybrid running mode as the running mode depending on a driving state, so as to cause the vehicle 10 to run in a selected one of the running modes. For example, the hybrid control portion 93 establishes the motor running mode when the required drive power Prdem is in a motor running region smaller than a predetermined threshold value, and establishes the hybrid running mode when the required drive power Prdem is in a hybrid running region equal to or greater than the predetermined threshold value. In FIG. 7, one-dot chain line A is a boundary line for switching the drive force source for driving the vehicle 10 between at least the engine 14 and only the second rotating machine MG2. That is, the one-dot chain line A of FIG. 7 is a boundary line between the hybrid running region and the motor running region for switching between the hybrid running and the motor running. A predetermined relationship having the boundary line as indicated by the one-dot chain line A of FIG. 7 is an example of a drive-force source switching map defined by the two-dimensional coordinates of variables in the form of the vehicle running speed V and the required drive force Frdem. It is noted that, in FIG. 7, the drive-force source switching map is shown together with AT gear position shift map, for convenience of the description.

The hybrid control portion 93 establishes the motor running mode when the required drive power Prdem is in the motor running region, and establishes the hybrid running mode when the required drive power Prdem is in the hybrid running region. However, even when the required drive power Prdem is in the motor running region, the hybrid control portion 93 establishes the hybrid running mode if the charged state value SOC of the battery 54 is less than a predetermined engine-start threshold value. The motor running mode is a driving state in which the vehicle 10 is caused to run by the driving torque generated by the second rotating machine MG2, with the engine 14 being stopped. The hybrid running mode is a driving state in which the vehicle 10 is caused to run with the engine 14 being operated. The engine-start threshold value is a predetermined threshold value for determining that the state-of-charge value SOC reaches a level at which the engine 14 must forcibly be started for charging the battery 54.

When establishing the hybrid running mode upon stop of operation of the engine 14, the hybrid control portion 93 executes a control for staring the engine 14. For staring the engine 14, the hybrid control portion 93 increases the engine rotational speed Ne by the first rotating machine MG1, and starts the engine 14, by igniting when the engine rotational speed Ne becomes at least a certain speed value that is an ignitable speed value. That is, the hybrid control portion 93 starts the engine 14 by cranking the engine 14 by the first rotating machine MG1.

The driving control portion 94 is capable of executing, as a drive control for driving the vehicle 10, a selected one of a manual drive control for driving the vehicle 10 in accordance with driving operations made by the vehicle driver and a drive assist control for driving the vehicle 10 without depending on the driving operations made by the vehicle driver. The manual drive control is for causing the vehicle 10 to run by manual operations, i.e., the driving operation manually made by the vehicle driver. The manual drive control is a driving method for casing the vehicle 10 to run by the vehicle driver's driving operations such as an accelerating operation, a barking operation and a steering operation. The drive assist control is for causing the vehicle 10 to run, for example, with a drive assist by which the driving operations are automatically assisted. The drive assist is a driving method for causing the vehicle 10 to run, for example, by automatically accelerating, decelerating and braking the vehicle 10, by controls executed by the electronic control apparatus 90, based on the signals and information supplied from the various sensors, without depending on the driving operations made by the vehicle driver, namely, without depending on intentions of the vehicle driver. The drive assist control is, for example, the automatic drive control in which the vehicle 10 is accelerated, decelerated, braked and steered, depending on a target driving state that is automatically determined based on, for example, the map information and the destination point inputted by the vehicle driver. It is noted that the drive assist control may be broadly interpreted to encompass the cruise control in which some of the driving operations such as the steering operation are executed by the vehicle driver while the other driving operations such as the accelerating, decelerating and braking operations are automatically executed.

When a drive-assist mode is not selected with the automatic-drive selecting switch and the cruise switch of the drive-assist setting switches 84 being placed in OFF, the driving control portion 94 establishes a manual drive mode so as to execute the manual drive control. The driving control portion 94 executes the manual drive control by outputting commands for controlling the step-variable transmission portion 20, engine 14 and first and second rotating machines MG1, MG2, wherein the commands are supplied to the AT shift control portion 92 and the hybrid control portion 93.

When an automatic drive mode is selected with the automatic-drive selecting switch of the drive-assist setting switches 84 being placed in ON by the vehicle driver, the driving control portion 94 establishes the automatic drive mode so as to execute the automatic drive control. Specifically, the driving control portion 94 automatically sets a target driving state that is dependent on, for example, the destination point inputted by the vehicle driver, the own-vehicle location information based on the location information Ivp, the map information based on the navigation information Inavi and various information relating to the running road and based on the vehicle area information Iard. The driving control portion 94 executes the automatic drive control for automatically accelerating, decelerating and steering the vehicle 10, based on the set target driving state. To this end, the driving control portion 94 outputs the commands for controlling the step-variable transmission portion 20, engine 14 and rotating machines MG1, MG2, and the outputted commands are supplied to the AT shift control portion 92 and the hybrid control portion 93. Further, in this instance, the driving control portion 94 outputs the brake-control command signal Sbra for obtaining the required braking torque, and the steering-control command signal Sste for controlling steering of the front wheels, wherein the outputted brake-control command signal Sbra and steering-control command signal Sste are supplied to the wheel brake device 86 and the steering device 88, respectively.

In the vehicle 10, there is a probability that a failure is caused due to a peculiar driving state. This peculiar driving state is a failure-causing driving state that is a driving state causing a failure. By knowing the failure-causing driving state, it is possible to advantageously set various kinds of endurance conditions and design strength criterion, and to check a learning convergence value of the various controls such as the shift control operation in the vehicle 10.

To this end, the electronic control apparatus 90 has a function serving as a vehicle failure-factor specifying apparatus configured to specify the failure-causing driving state in event of a failure in the vehicle 10. For performing a control function of efficiently determining or specifying the failure-causing driving state in event of a certain failure in the vehicle 10, the electronic control apparatus 90 further includes a state determining means or portion in the form of a state determining portion 95, a peculiarity-presence determining means or portion in the form of a peculiarity-presence determining portion 96 and a failure-causing-driving state specifying means or portion in the form of a failure-causing-driving-state specifying portion 98.

The state determining portion 95 is configured to determine whether a certain failure has occurred in the vehicle 10. The certain failure is interpreted to mean a predetermined failure that could arise from, for example, a peculiar operation made by a vehicle driver. The peculiar operation made by the vehicle driver may be defined as an operation by which a distribution of a driving-state-related value (such as the accelerator operation degree θacc and the vehicle running speed V) representing the driving state is deviated from a distribution of the driving-state-related value in cases without occurrence of the certain failure. Specifically, the certain failure is a shift failure caused in the step-variable transmission portion 20 as a vehicle transmission. The shift failure of the step-variable transmission portion 20 could be caused, for example, due to reduction of durability of friction members of the engagement devices CB, or due to temporary malfunction of the engagement devices CB arising from, for example, considerable increase of temperature of the friction members of the engagement devices CB. For example, if the same kind of shift control operation is repeatedly executed in a short length of time in a state in which the accelerator is fully opened or almost fully opened, or if a manual shift operation is repeatedly executed in a short length of time in a state in which the accelerator is fully opened, for example, in a speedway track racing circuit course, the durability of the friction members of the engagement devices CB could be easily reduced. The shift control operation of the step-variable transmission portion 20 is categorized into a plurality of kinds, for example, depending on whether the shift control operation is a shift-up operation or a shift-down operation, an automatic shift operation or a manual shift operation, and a power-on shift operation or a power-off shift operation, and between which gear positions the shift control operation is executed.

The state determining portion 95 is configured, for example, after completion of a learning control α for converging a racing of the engine rotational speed Ne or the MG2 rotational speed Nm during a shift control operation in the step-variable transmission portion 20, to determine whether a shift failure has occurred or not in the step-variable transmission portion 20, depending on whether an amount of racing of the engine rotational speed Ne or the MG2 rotational speed Nm has become not smaller than a threshold value during the shift control operation. The above-described racing is a phenomenon in which, for example, the engine rotational speed Ne or the MG2 rotational speed Nm is increased to be larger than a rotational speed based on the gear ratio γat and the output rotational speed No of the step-variable transmission portion 20. The above-described amount of racing corresponds to an amount of increase of the rotational speed upon occurrence of the racing. The threshold value of the amount of racing is a predetermined threshold value by which it can be determined whether a high racing causing the shift failure of the step-variable transmission portion 20 has occurred or not. Alternatively, the state determining portion 95 may be configured, for example, after completion of a learning control β for suppressing a shift shock during a shift control operation in the step-variable transmission portion 20, to determine whether the shift failure has occurred or not in the step-variable transmission portion 20, depending on whether a shift shock causing the longitudinal acceleration Gx to become not lower than a threshold acceleration value during the shift control operation. The threshold acceleration value is a predetermined threshold value by which it can be determined whether a high longitudinal acceleration Gx causing the shift failure has been generated or not.

Figure 8:
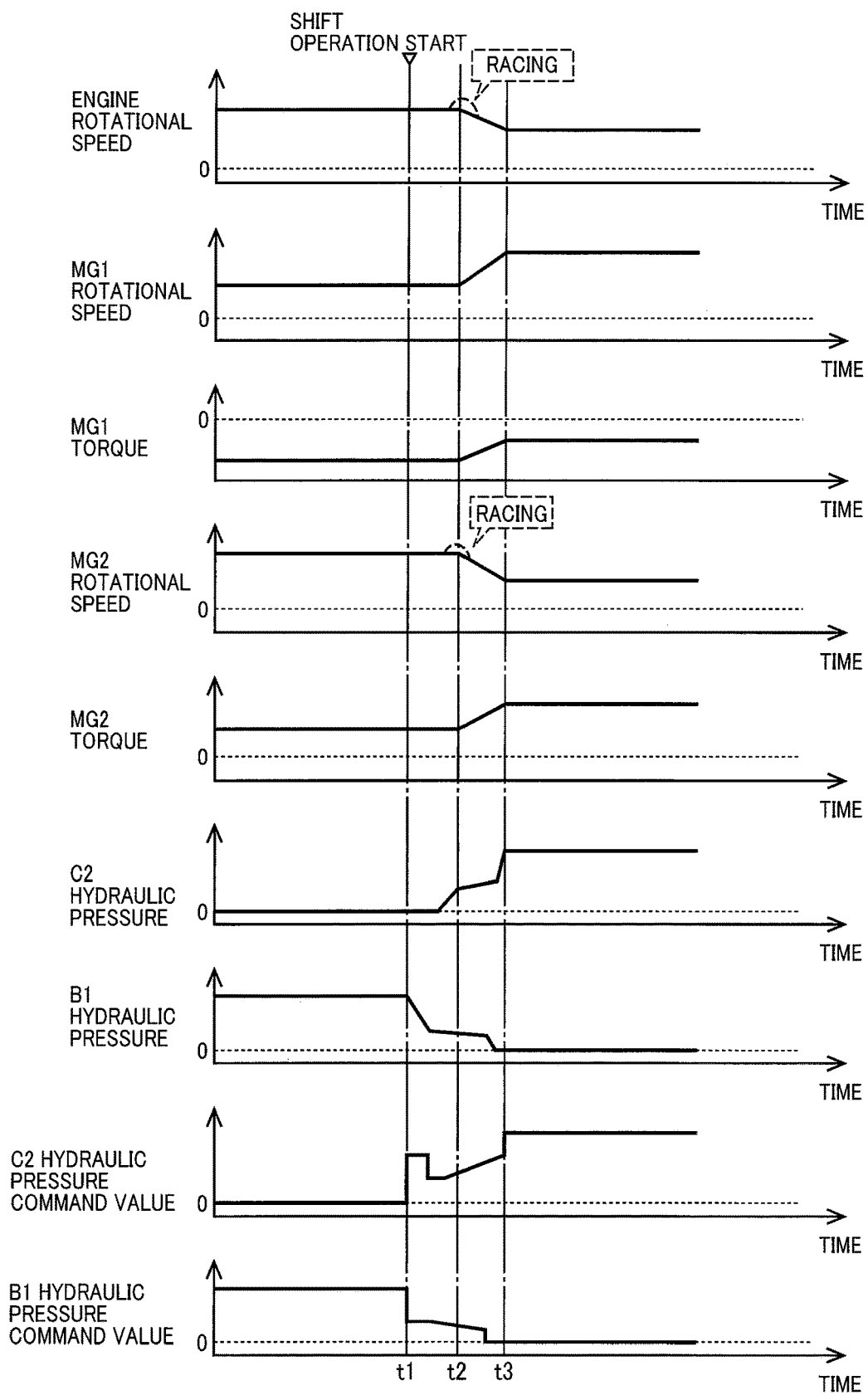
FIG. 8 is a time chart for explaining an example of a shift failure in the step-variable transmission portion.

FIG. 8 is a time chart for explaining an example of the shift failure in the step-variable transmission portion 20. In FIG. 8, a period from a time point t1 to a time point t3 indicates a period in which a shift-up action from 2nd to 3rd is being executed. In process of the clutch-to-clutch shifting operation, the learning control is executed to compensate or amend the hydraulic command values such that the amount of racing of the engine rotational speed Ne or the MG2 rotational speed Nm is held in a considerably small amount range. For example, during the shift control operation, when the racing amount is large upon occurrence of the racing of the engine rotational speed Ne or the MG2 rotational speed Nm (see vicinity of the time point t2 in FIG. 8), an initial pressure value of the C2 hydraulic pressure applied to the clutch C2 that is be engaged, is increased in the next execution of the shift-up action from 2nd to 3rd. On the other hand, when the racing amount is almost zero or small, the initial pressure value of the C2 hydraulic pressure is reduced in the next execution of the shift-up action from 2nd to 3rd. The learning control is completed with the racing amount of the engine rotational speed Ne or the MG2 rotational speed Nm being held in the considerably small amount range by the amendment of the hydraulic command values. After the completion of the learning control, if the racing amount becomes larger than a predetermined threshold value, as indicated by broken lines in FIG. 8, it is determined that the shift failure has occurred in the step-variable transmission portion 20. It is noted that the learning control may be executed by amending the hydraulic command values such that the racing is converged within a predetermined length of time, rather than such that the racing amount is held in the considerably small amount range.

When it is determined by the state determining portion 95 that the certain failure has occurred, the peculiarity-presence determining portion 96 determines, based on pre-failure data representing a pre-failure driving state, whether a peculiarity has been present or absent in the pre-failure driving state of the vehicle 10. The peculiarity in the pre-failure driving state is interpreted to mean a driving-state peculiarity in which distribution of the pre-failure driving state is deviated from distribution of the driving state in a non-failure case without occurrence of the certain failure. In the following description of the present embodiment, the peculiarity in the pre-failure driving state will be referred to as "driving-state peculiarity". The pre-failure driving state is interpreted to mean a certain driving state in a stage prior to occurrence of the certain failure. The certain driving state is interpreted mean the driving state representing an operation made by the vehicle driver in execution of a certain control operation and/or the driving state having arisen from an operation made by the vehicle driver in execution of the certain control operation. Specifically, the certain driving state may be, for example, the accelerator operation degree θacc, the vehicle running speed V and/or the working fluid temperature THoil. It is also possible to interpret that the certain driving state is represented by a value of each of at least one of the accelerator operation degree θacc, the vehicle running speed V and the working fluid temperature THoil, which may be referred to as "driving-state-related value". The driving state represented by the value (driving-state-related value) of each of the accelerator operation degree θacc, the vehicle running speed V and the working fluid temperature THoil is useful, for example, where the certain failure is a shift failure in the step-variable transmission portion 20. Where the certain failure is the shift failure in the step-variable transmission portion 20, the driving-state-related value of the certain driving state is categorized into a plurality of groups corresponding to respective kinds of the shift control operation of the step-variable transmission portion 20.

Specifically, when it is determined by the state determining portion 95 that the certain failure has occurred, the peculiarity-presence determining portion 96 specifies or defines a frequency distribution of the pre-failure driving state, based on the stored pre-failure data representing the pre-failure driving state. To this end, the peculiarity-presence determining portion 96 obtains the pre-failure data representing the pre-failure driving state in a certain period from a predetermined time point prior to a failure-occurring time point (i.e., a time point at which the occurrence of the certain failure was determined by the state determining portion 95), to the failure-occurring time point. The certain period is a selected one of a plurality of different lengths of time, such that, when the frequency distribution cannot be defined by the pre-failure driving state in the smallest one of the different lengths of time, the second smallest one of the different lengths of time is selected. When the frequency distribution cannot be defined by the pre-failure driving state in the second smallest one of the different lengths of time, the third smallest one of the different lengths of time is selected. Thus, the certain period is increased step by step, until the frequency distribution can be defined. The frequency distribution represents a frequency (i.e., number of instance) in which the driving-state-related value as a variable appeared in each of various levels during the above-described certain period, which is a selected one of the plurality of different lengths of time.

Further, when it is determined by the state determining portion 95 that the certain failure has occurred, the peculiarity-presence determining portion 96 obtains, for example, from the above-described server 210, non-failure data representing a non-failure state that is the certain driving state of each of a plurality of vehicles including the above-described at least one other vehicle 200 (that is other than the vehicle 10) in the non-failure case in which the certain control operation is executed satisfactorily in each of the plurality of vehicles, wherein the plurality of vehicles may include the vehicle 10 in addition to the at least one other vehicle 200. The obtained non-failure data represents the non-failure state in a certain period from a predetermined time point prior to the above-described failure-occurring time point (i.e., the time point at which the occurrence of the certain failure in the vehicle 10 was determined by the state determining portion 95), to the failure-occurring time point. The frequency in the frequency distribution of the non-failure driving state is a total number of instances in which the driving-state-related value appears in each of various levels in the above-described plurality of vehicles in a frequency-distribution defining period (i.e., period in which the frequency distribution is defined), namely, a total number of instances for each of the various levels of the driving-state-related value in the frequency-distribution defining period. The total number of instances may be replaced by an average of the total number of instances which is the total number of instances divided by the number of vehicles constituting the above-described plurality of vehicles. The peculiarity-presence determining portion 96 obtains the non-failure data in a certain period from a predetermined time point prior to the failure-occurring time point, to the failure-occurring time point, wherein the certain period is a length of time that is long enough to define the frequency distribution, namely, wherein the predetermined time point is a point of time that is early enough to define the frequency distribution. The server 210 collects the non-failure data representing the non-failure driving state, from the above-described plurality of vehicles including the at least one other vehicle 200 and optionally the vehicle 10, and stores the collected non-failure data. The non-failure data is a part of a big data stored in the server 210.

Figure 9:
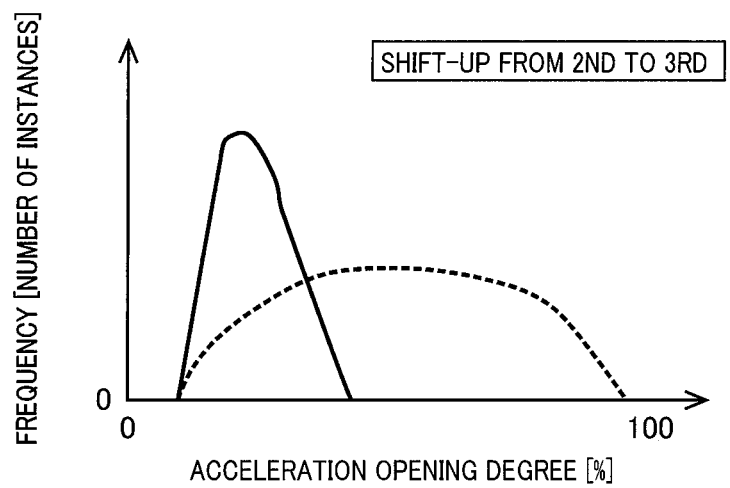
FIG. 9 is a view showing an example of a frequency distribution of an accelerating operation amount in a shift-up action from a second speed AT gear position to a third speed AT gear position.
Figure 10:
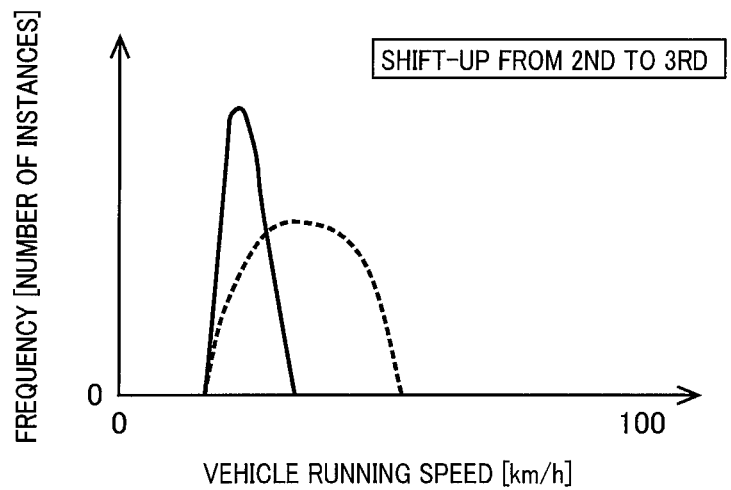
FIG. 10 is a view showing an example of the frequency distribution of a vehicle running speed in the shift-up action from the second speed AT gear position to the third speed AT gear position.
Figure 11:
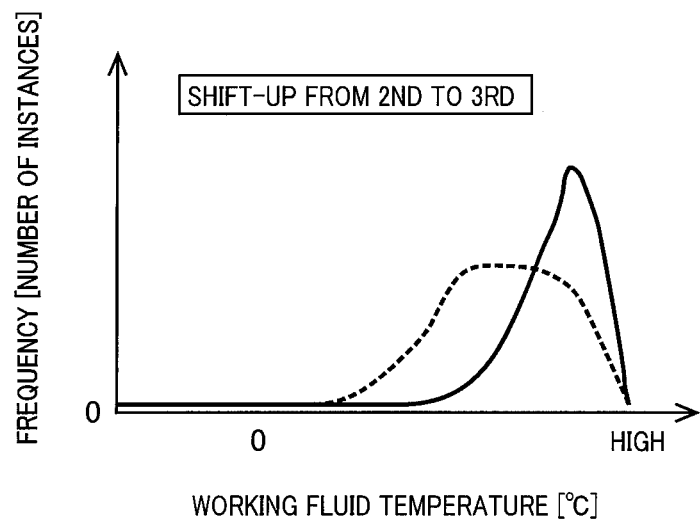
FIG. 11 is a view showing an example of the frequency distribution of a working fluid temperature in the shift-up action from the second speed AT gear position to the third speed AT gear position.

FIG. 9 is a view showing an example of the frequency distribution of the accelerator operation degree θacc in execution of the certain control operation in the form of a control operation for a shift-up action from 2nd to 3rd. FIG. 10 is a view showing an example of the frequency distribution of the vehicle running speed V in the execution of the control operation for the shift-up action from 2nd to 3rd. FIG. 11 is a view showing an example of the frequency distribution of the working fluid temperature THoil in the execution of the control operation for the shift-up action from 2nd to 3rd. In each of FIGS. 9, 10 and 11, broken line represents an example of the frequency distribution of the non-failure driving state in the shift-up action from 2nd to 3rd, wherein the frequency distribution is defined by using the big data stored in the server 210, while solid line represents an example of the frequency distribution of the pre-failure driving state in case of occurrence of the shift failure of the shift-up action from 2nd to 3rd. When the frequency distribution of the pre-failure driving state represented by the solid line is similar to the frequency distribution of the non-failure driving state represented by the broken line, it is determined that the driving-state peculiarity has not been present in the pre-failure driving state. On the other hand, when the frequency distribution represented by the solid line is different or deviated from the frequency distribution represented by the broken line, it is determined that the driving-state peculiarity has not been present in the pre-failure driving state. When a peculiar operation is continuously executed by the vehicle driver due to his or her habit or other reason, the frequency distribution represented by the solid line becomes a peculiar distribution that is deviated from the frequency distribution represented by the broken line. It is noted that, in each of FIGS. 9, 10 and 11, the frequency in the frequency distribution of the non-failure driving state represented by the broken line indicates the average of the number of instances, which is obtained by dividing the number of instances by the number of vehicles, for easier understanding of its comparison with the frequency in the frequency distribution of the pre-failure driving state represented by the solid line. It is also noted that, since the control operation for the shift-up action from 2nd to 3rd shown in each of FIGS. 9, 10 and 11 is an automatic shift control operation using the AT gear position shift map, the distribution of the vehicle running speed V is limited in a certain range of the vehicle running speed V, as shown in FIG. 10.

The peculiarity-presence determining portion 96 determines whether the driving-state peculiarity has been present or absent, depending on whether the frequency distribution of the pre-failure driving state of the vehicle is deviated from the frequency distribution of the non-failure driving state of each of the plurality of vehicles. Specifically, the peculiarity-presence determining portion 96 obtains or calculates (i) a pre-failure average value that is an average of the driving-state-related value of the certain driving state in the frequency distribution of the pre-failure driving state and (ii) a non-failure average value that is an average of the driving-state-related value of the certain driving state in the frequency distribution of the non-failure driving state, and then determines that the driving-state peculiarity has been present when the pre-failure average value is different from the non-failure average value by at least a threshold value A. Alternatively, the peculiarity-presence determining portion 96 additionally obtains or calculates (iii) a pre-failure dispersion value that is a dispersion of the driving-state-related value of the certain driving state in the frequency distribution of the pre-failure driving state and (iv) a non-failure dispersion value that is a dispersion of the driving-state-related value of the certain driving state in the frequency distribution of the non-failure driving state, and then determines that the driving-state peculiarity has been present when the pre-failure average value is different from the non-failure average value by at least the above-described threshold value A and the pre-failure dispersion value is different from the non-failure dispersion value by at least a threshold value B. Each of the threshold values A, B is a predetermined threshold value by which it can be determined whether the driving-state peculiarity has been present or not. In short, the presence or absence of the driving-state peculiarity can be determined depending on the difference between the frequency distribution of the pre-failure driving state and the frequency distribution of the non-failure driving state, by a quantitative comparison through a known statistical method.

Each of the at least one other vehicle 200 has substantially the same functions as the vehicle 10, as described above. Therefore, as in the vehicle 10, in each of the at least one other vehicle 200, too, when it is determined that the certain failure has occurred, the presence or absence of the driving-state peculiarity can be determined based on the pre-failure data representing the pre-failure driving state.

When the occurrence of the certain failure and the presence of the driving-state peculiarity are both determined by the state determining portion 95 and the peculiarity-presence determining portion 96, respectively, the failure-causing-driving-state specifying portion 98 determines whether the peculiarity present in the pre-failure driving state of the vehicle 10 is substantially coincident or identical with a peculiarity that has been determined present in the pre-failure driving state of at least one of the at least one other vehicle 200 in the event of the certain failure in the at least one other vehicle 200. Specifically, this determination may be made by determining whether the frequency distribution of the pre-failure driving state of the vehicle 10 with the presence of the driving-state peculiarity is substantially coincident or identical with the frequency distribution of the pre-failure driving state of at least one of the at least one other vehicle 200 with the presence of the driving-state peculiarity, by seeing if there is a difference between the frequency distribution of the pre-failure driving state of the vehicle 10 and the frequency distribution of the pre-failure driving state of the at least one other vehicle 200 by a quantitative comparison through a known statistical method, i.e., in a method substantially the same as the above-described method through which the presence or absence of the driving-state peculiarity is determined as described above. The term "substantially coincident or identical" is interpreted to mean not only "completely coincident or identical" but also "close to such a degree that they can be regraded coincident or identical". That is, the failure-causing-driving-state specifying portion 98 determines whether the driving-state peculiarity in the vehicle 10 and the driving-state peculiarity in at least one of the at least one other vehicle 200 can be regarded coincident or identical with each other or not. When determining that they are regarded coincident or identical with each other, the failure-causing-driving-state specifying portion 98 determines that the pre-failure driving state of the vehicle 10 having the driving-state peculiarity is the above-described failure-causing driving state. It is noted that, where the at least one other vehicle 200 consist of a plurality of other vehicles such as the other vehicles 200a, 200b, it is determined that the driving-state peculiarity in the vehicle 10 is substantially coincident or identical with the driving-state peculiarity in the plurality of other vehicles 200, as long as the plurality of other vehicles 200 includes at least one vehicle that is substantially coincident or identical with the vehicle 10 in terms of the driving-state peculiarity. However, it may be determined that the driving-state peculiarity in the vehicle 10 is substantially coincident or identical with the driving-state peculiarity in the plurality of other vehicles 200 when at least a majority of the plurality of other vehicles 200 is substantially coincident or identical with the vehicle 10 in terms of the driving-state peculiarity.

When it is determined by the peculiarity-presence determining portion 96 that the driving-state peculiarity has been absent in the pre-failure driving state of the vehicle 10, or when it is determined by the failure-causing-driving-state specifying portion 98 that the driving-state peculiarity in the vehicle 10 cannot be regarded coincident or identical with the driving-state peculiarity in any one of the at least one other vehicle 200, namely, the driving-state peculiarity in the vehicle 10 is different from the driving-state peculiarity in any one of the at least one other vehicle 200, the failure-causing-driving-state specifying portion 98 determines that the failure-causing driving state has been absent, and causes the information notification device 89, for example, to indicate that the failure-causing driving state has been absent. On the other hand, when determining that the driving-state peculiarity in the vehicle 10 can be regarded identical with the driving-state peculiarity in at least one of the at least one other vehicle 200, the failure-causing-driving-state specifying portion 98 determines that the failure-causing driving state has been present, and causes the information notification device 89, for example, to indicate that the failure-causing driving state has been present.

Figure 12:
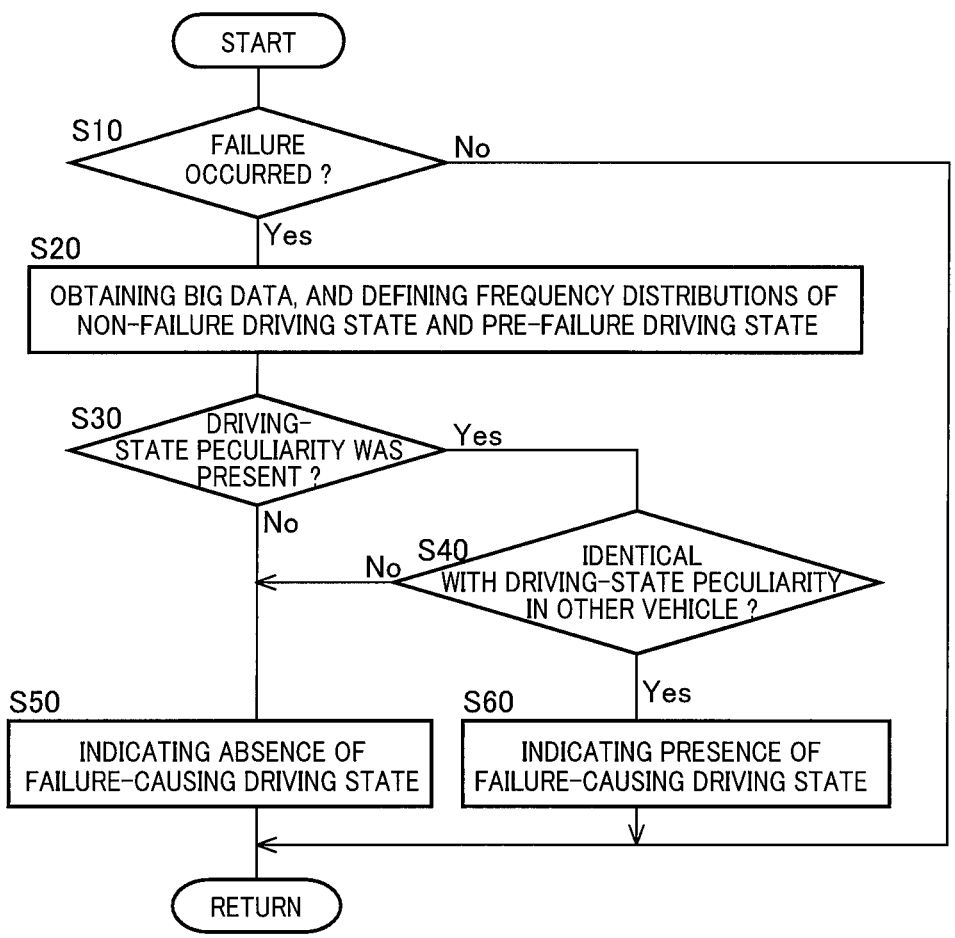
FIG. 12 is a flow chart showing a main part of a control routine executed by the electronic control apparatus, namely, a control routine that is executed for efficiently specifying a failure-causing driving state in event of a certain failure in the vehicle.

FIG. 12 is a flow chart showing a main part of a control routine executed by the electronic control apparatus 90, namely, a control routine that is executed for efficiently specifying the failure-causing driving state in event of a certain failure in the vehicle 10. This control routine is executed, for example, in a repeated manner.

The control routine is initiated by step S10 corresponding to function of the state determining portion 95, which is implemented to determine whether a certain failure has occurred in the vehicle 10. When a negative determination is made at step S10, one cycle of execution of the control routine is completed. When an affirmative determination is made at step S10, step S20 corresponding to function of the peculiarity-presence determining portion 96 is implemented to obtain the non-failure data as a part of the big data, from the server 210 and to define the frequency distribution of the non-failure driving state. Further, in this step S20, the frequency distribution of the pre-failure driving state is defined, too. Then, at step S30 corresponding to function of the peculiarity-presence determining portion 96, it is determined whether the driving-state peculiarity has been presented or not, depending on whether the frequency distribution of the pre-failure driving state is deviated from the frequency distribution of the non-failure driving state or not. When an affirmative determination is made at step S30, the control flow goes to step S40 corresponding to function of the failure-causing-driving-state specifying portion 98, which is implemented to determine whether the driving-state peculiarity in the vehicle 10 is substantially identical with the driving-state peculiarity in at least one of the at least one other vehicle 200. When a negative determination is made at step S30 or step S40, the control flow goes to step S50 corresponding to function of failure-causing-driving-state specifying portion 98. In this step S50, it is determined that the failure-causing driving state has been absent, and it is indicated that the failure-causing driving state has been absent. When an affirmative determination is made at step S40, the control flow goes to step S60 corresponding to function of failure-causing-driving-state specifying portion 98. In this step S60, it is determined that the failure-causing driving state has been present, and it is indicated that the failure-causing driving state has been present. In this step S60, a content of the failure-causing driving state, i.e., a content of the driving-state peculiarity, is indicated, too.

As described above, in the present embodiment, the presence or absence of the driving-state peculiarity in the pre-failure driving state is determined depending on whether the frequency distribution of the pre-failure driving state of the vehicle is deviated from the frequency distribution of the non-failure driving state. That is, the pre-failure driving state of the vehicle 10 could be appropriately determined as the failure-causing driving state, based on comparison of the driving-state peculiarity present in the pre-failure driving state of the vehicle 10 with the driving-state peculiarity present in the pre-failure driving state of the at least one other vehicle 200. Therefore, in event of the certain failure in the vehicle 10, it is possible to efficiently specify the failure-causing driving state.

In the present embodiment, the pre-failure data in the certain period from the predetermined time point (prior to the failure-occurring time point) until the failure-occurring time point, is obtained, wherein the certain period is the length of time that is long enough to define the frequency distribution of the pre-failure driving state. Therefore, the frequency distribution of the pre-failure driving state can be appropriately defined.

In the present embodiment, the certain failure is the shift failure in the step-variable transmission portion 20, i.e., a performance reduction in a shift control operation executed in the step-variable transmission portion 20, so that the failure-causing driving state can be efficiently specified in event of the shift failure in step-variable transmission portion 20.

In the present embodiment, the driving-state-related value representing the certain driving state is categorized into the plurality of groups corresponding to respective different kinds of the shift control operation that is to be executed in the step-variable transmission portion 20. Thus, the failure-causing driving state can be efficiently specified in each of the different kinds of the shift control operation.

In the present embodiment, the certain driving state is represented by at least one of the accelerator operation degree θacc, the vehicle running speed V and the working fluid temperature THoil, so that it is possible to efficiently specify a peculiar operation which is made by the vehicle driver and which causes the failure in the vehicle, or a peculiar running environment which is caused by operation of the vehicle driver and which causes the failure in the vehicle.

While the preferred embodiment of this invention has been described in detail by reference to the drawings, it is to be understood that the invention may be otherwise embodied.

For example, in the above-described embodiment, the electronic control apparatus 90 has a function serving as the vehicle failure-factor specifying apparatus, namely, the vehicle failure-factor specifying apparatus is constituted by the electronic control apparatus 90. However, at least a part or an entirety of the vehicle failure-factor specifying apparatus may be constituted by the server 210 or the external rewriting device 220, in place of the electronic control apparatus 90. Further, the present or absence of the failure-causing driving state and/or the content of the failure-causing driving state may be displayed in the external rewriting device 220 or in a monitor of a personal computer or the like connected to the server 210 via a certain network. Further, where the server 210 or the external rewriting device 220 serves as the vehicle failure-factor specifying apparatus, the server 210 or the external rewriting device 220 may indicate or display ID (identification) of the vehicle 10, too.

In the above-described embodiment, the certain failure is the shift failure of the step-variable transmission portion 20 that is an example of the failure that could be caused as a result of the peculiar operation made by the vehicle driver. However, the certain failure may be any of other kinds of failures such as a failure that causes a fail-safe system to be operated in event of occurrence of the failure.

In the above-described embodiment, the frequency of the frequency distribution is the number of instances in which the driving-state-related value appeared in each of the various levels during the frequency-distribution defining period, namely, the number of instances in each of the various levels of the driving-state-related value during the frequency-distribution defining period. It should be noted that the term "number of instances" may be interpreted to encompass also a ratio (=number of instances/total number of instance) [%] of the number of instances in which the driving-state-related value appeared in each of the various levels, to the total number of instances in which the driving-state-related value appeared in all of the various levels, during the frequency-distribution defining period, namely, a ratio [%] of the number of instances in each of the various levels of the driving-state-related value to the total number of instances in all of the various levels of the driving-state-related value during the frequency-distribution defining period. Further, the frequency-distribution defining period (i.e., period in which the frequency distribution is defined) does not have to be necessarily a length of time, but may be, for example, a vehicle running distance such that the frequency distribution is defined during a period in which the vehicle 10 runs for a certain distance.

In the above-described embodiment, the vehicle 10 including the transmission device 40 is described as an example of the vehicle in which the certain failure could be caused due to the peculiar operation made by the vehicle driver. However, the present invention is applicable not only to the vehicle 10 having the transmission device 40 but also to any one of vehicles in which a certain failure could be caused.

It is to be understood that the embodiment described above are given for illustrative purpose only, and that the present invention may be embodied with various modifications and improvements which may occur to those skilled in the art.

NOMENCLATURE OF ELEMENTS

10: vehicle
20: mechanically-operated step-variable transmission portion (vehicle transmission)
90: electronic control apparatus (vehicle failure-factor specifying apparatus)
96: peculiarity-presence determining portion
98: failure-causing-driving-state specifying portion
200 (200a,200b): at least one other vehicle

What is claimed is:

1. A vehicle failure-factor specifying apparatus configured, in event of a certain failure in a vehicle in execution of a certain control operation, to specify a failure-causing driving state that caused the certain failure, the vehicle failure-factor specifying apparatus comprising:

a peculiarity-presence determining portion configured, in the event of the certain failure in the vehicle, to determine, based on pre-failure data representing a pre-failure driving state that is a certain driving state in a stage prior to occurrence of the certain failure, whether a peculiarity has been present or absent in the pre-failure driving state of the vehicle; and a failure-causing-driving-state specifying portion configured, when the peculiarity-presence determining portion determines that the peculiarity has been present in the pre-failure driving state of the vehicle in the event of the certain failure in the vehicle, to determine whether the peculiarity present in the pre-failure driving state of the vehicle is substantially identical with a peculiarity that has been determined present in the pre-failure driving state of at least one other vehicle other than the vehicle in the event of the certain failure in the at least one other vehicle, wherein the failure-causing-driving-state specifying portion specifies the pre-failure driving state as the failure-causing driving state, when determining that the peculiarity present in the pre-failure driving state of the vehicle is substantially identical with the peculiarity present in the pre-failure driving state of each of the at least one other vehicle, and wherein the peculiarity-presence determining portion determines whether the peculiarity has been present or absent in the pre-failure driving state of the vehicle, depending on whether a frequency distribution of the pre-failure driving state of the vehicle is deviated from a frequency distribution of a non-failure driving state that is the certain driving state of each of a plurality of vehicles including the at least one other vehicle in a non-failure case in which the certain control operation is executed satisfactorily in the each of the plurality of vehicles.

2. The vehicle failure-factor specifying apparatus according to claim 1, wherein the peculiarity-presence determining portion obtains the pre-failure data representing the pre-failure driving state in a certain period until a failure-occurring time point at which the certain failure has occurred, from a predetermined time point prior to the failure-occurring time point, such that the certain period is a length of time that is long enough to define the frequency distribution of the pre-failure driving state.

3. The vehicle failure-factor specifying apparatus according to claim 1, wherein the certain failure is a shift failure in a vehicle transmission.

4. The vehicle failure-factor specifying apparatus according to claim 3,
wherein the certain driving state is represented by a driving-state-related value, and
wherein the driving-state-related value is categorized into a plurality of groups corresponding to respective different kinds of a shift control operation of the vehicle transmission.

5. The vehicle failure-factor specifying apparatus according to claim 3, wherein the certain driving state is represented by a temperature of a working fluid in the vehicle transmission.

6. The vehicle failure-factor specifying apparatus according to claim 1, wherein the certain driving state is represented by an amount of accelerating operation made by a vehicle driver.

7. The vehicle failure-factor specifying apparatus according to claim 1, wherein the certain driving state is represented by a vehicle running speed.

8. The vehicle failure-factor specifying apparatus according to claim 1,
wherein the certain driving state is represented by a driving-state-related value, and
wherein each of the frequency distribution of the pre-failure driving state and the frequency distribution of the non-failure driving state represents a number of instances in which the driving-state-related value as a variable appeared in each of various levels in the execution of the certain control operation.

9. The vehicle failure-factor specifying apparatus according to claim 1
wherein the peculiarity-presence determining portion determines that the frequency distribution of the pre-failure driving state of the vehicle is deviated from the frequency distribution of the non-failure driving state of each of the plurality of vehicles, when at least one condition is satisfied,
wherein the certain driving state is represented by a driving-state-related value, and
wherein the at least one condition includes a condition that (i) an average of the driving-state-related value of the certain driving state in the frequency distribution of the pre-failure driving state, is different from (ii) an average of the driving-state-related value of the certain driving state in the frequency distribution of the non-failure driving state, by at least a threshold value.

\* \* \* \* \*